United States Patent
Ferraro

(10) Patent No.: US 12,001,590 B2
(45) Date of Patent: Jun. 4, 2024

(54) PREVENTING UNWANTED DATA LEAKAGE IN DATA NETWORK TRAFFIC USING CLOAKED REDIRECTS

(71) Applicant: NeptuneAds LLC, Weston, FL (US)

(72) Inventor: Enrique Andres Ferraro, Austin, TX (US)

(73) Assignee: NeptuneAds LLC, Weston, FL (US)

( * ) Notice: Subject to any disclaimer, the term of this patent is extended or adjusted under 35 U.S.C. 154(b) by 218 days.

(21) Appl. No.: 17/707,159

(22) Filed: Mar. 29, 2022

(65) Prior Publication Data
US 2023/0315908 A1    Oct. 5, 2023

(51) Int. Cl.
*G06F 21/62*    (2013.01)
*G06Q 30/0201*  (2023.01)

(52) U.S. Cl.
CPC ..... *G06F 21/6263* (2013.01); *G06Q 30/0201* (2013.01)

(58) Field of Classification Search
CPC .......... G06F 21/6263; G06Q 30/0201
See application file for complete search history.

(56) References Cited

U.S. PATENT DOCUMENTS

| | | | | |
|---|---|---|---|---|
| 8,707,441 B1* | 4/2014 | Cidambi | ............. | G06F 16/951 705/51 |
| 10,616,274 B1* | 4/2020 | Chang | ............. | G06F 16/9566 |
| 2003/0046361 A1* | 3/2003 | Kirsch | ............. | H04L 61/00 707/E17.115 |
| 2021/0120034 A1* | 4/2021 | Starov | ............. | G06F 21/563 |
| 2022/0345508 A1* | 10/2022 | Turnbull | ............. | H04L 1/0002 |
| 2023/0033907 A1* | 2/2023 | Akhter | ............. | H04L 63/0281 |

\* cited by examiner

*Primary Examiner* — Saleh Najjar
*Assistant Examiner* — Devin E Almeida
(74) *Attorney, Agent, or Firm* — Stephen J. Walder, Jr.

(57) ABSTRACT

A redirect cloaking system (RCS) is provided. The RCS receives, from a client computing device, an original request to access a resource from another computing device, and cloaks at least a portion of a redirect chain associated with servicing the original request such that at least a first portion of redirect responses of the redirect chain are not returned to the client computing device. The RCS returns at least one of a second portion of redirect responses of the redirect chain or the resource to the client computing device without exposing the first portion of redirect responses to the client computing device.

20 Claims, 8 Drawing Sheets

PREVENTING UNWANTED DATA LEAKAGE IN DATA NETWORK TRAFFIC USING CLOAKED REDIRECTS

BACKGROUND

The present application relates generally to an improved data processing apparatus and method and more specifically to mechanisms for preventing unwanted data leakage in data network traffic by providing a cloaked redirect functionality for computing systems and data networks.

A redirect is a mechanism used in modern distributed data processing systems, such as the Internet, to automatically make an application, such as an Internet browser, change its target location on the data network to a different location on the data network, e.g., from one web page to another. Using the Internet as an example, which utilizes Uniform Resource Locators (URLs) to identify locations of resources on a data network, the redirect is a line of computer code that is used to send an Internet browser application from one URL to another URL, where this other URL may be to the same or a different website. This is often referred to as URL redirection or URL forwarding.

Using the Hypertext Transfer Protocol (HTTP) and the Internet as an example, a redirect of a URL is triggered by a computing system sending a special redirect response to a request specifying a first URL. These redirect responses have status codes and a location header holding the URL to redirect the request to. When an Internet browser application receives the redirect, the browser loads the new URL provided in the location header.

There are three primary types of redirects. First, redirects may be temporary redirects, such as when a website is undergoing maintenance or is otherwise down and not operating to service browser requests. Temporary redirects are often used to allow a webpage or other resource associated with the URL to be temporarily accessed from a different location. Temporary redirects may also be used when creating, modifying, or deleting resources, such as to show temporary progress web pages or the like. Contrary to permanent redirects, search engines, web crawlers, and the like, do not replace the original URL with the temporary URL. Examples of temporary redirects include a "found" redirect (status code 302), a "see other" redirect (status code 303), and a "temporary redirect" (status code 307), each of which may be implemented in different use cases.

Second, redirects may also be permanent redirects that are intended to last for a long period of time and operate to replace the original URL with a new URL. Currently, permanent redirects have two primary types, i.e., a "moved permanently" (status code 301) redirect and a "permanent redirect" (status code 308), which achieve similar results but may be implemented in different use cases.

Third, there are special redirects which may be used in special situations to redirect a request for a URL to a locally cached copy of the resource, or to perform a manual redirection where a listing of possible redirections are presented for selection by a user. These special redirects include a "multiple choice" redirect (status code 300) and a "not modified" redirect (status code 304), which again may be implemented in different use cases.

Two other types of important redirects to mention include the meta header redirect and the Javascript™ programming language (Javascript™ is a trademark of Oracle Corporation) redirect. With the meta header redirect, while in normal HTTP redirects the web server sends a redirect HTTP code (e.g., a "3xx" code) and a destination URL, in a meta header redirect the server sends to the client computing device a normal 200 code signaling that the requested content was found, and then inside of one of the first lines of content, the server will send "<meta http-equiv="refresh" content="5; url=https://example.com/">", where this text is usually placed between <head> </head> tags. This text instructs the rendering engine in the browser to redirect the browser to the content at "https://example.com/" after an elapsed time period. Typical meta refresh redirects specify either 0 seconds (immediately) or leave this time parameter unspecified and the browser redirects immediately. This type of redirect does not rely on HTTP header codes.

With the Javascript™ redirect, these redirects happen when the browser loads the web page contents which contain a <script> tag indicating a program written in Javascript™. When the browser executes this script, the script may tell the browser to redirect to content at a different URL. This type of redirect also does not rely on HTTP codes.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for implementing a redirect cloaking system. The method comprises receiving, by the redirect cloaking system from a client computing device, an original request to access a resource from another computing device, and cloaking, by the redirect cloaking system, at least a portion of a redirect chain associated with servicing the original request such that at least a first portion of redirect responses of the redirect chain are not returned to the client computing device. The method also comprises returning, by the redirect cloaking system, at least one of a second portion of redirect responses of the redirect chain or the resource to the client computing device without exposing the first portion of redirect responses to the client computing device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
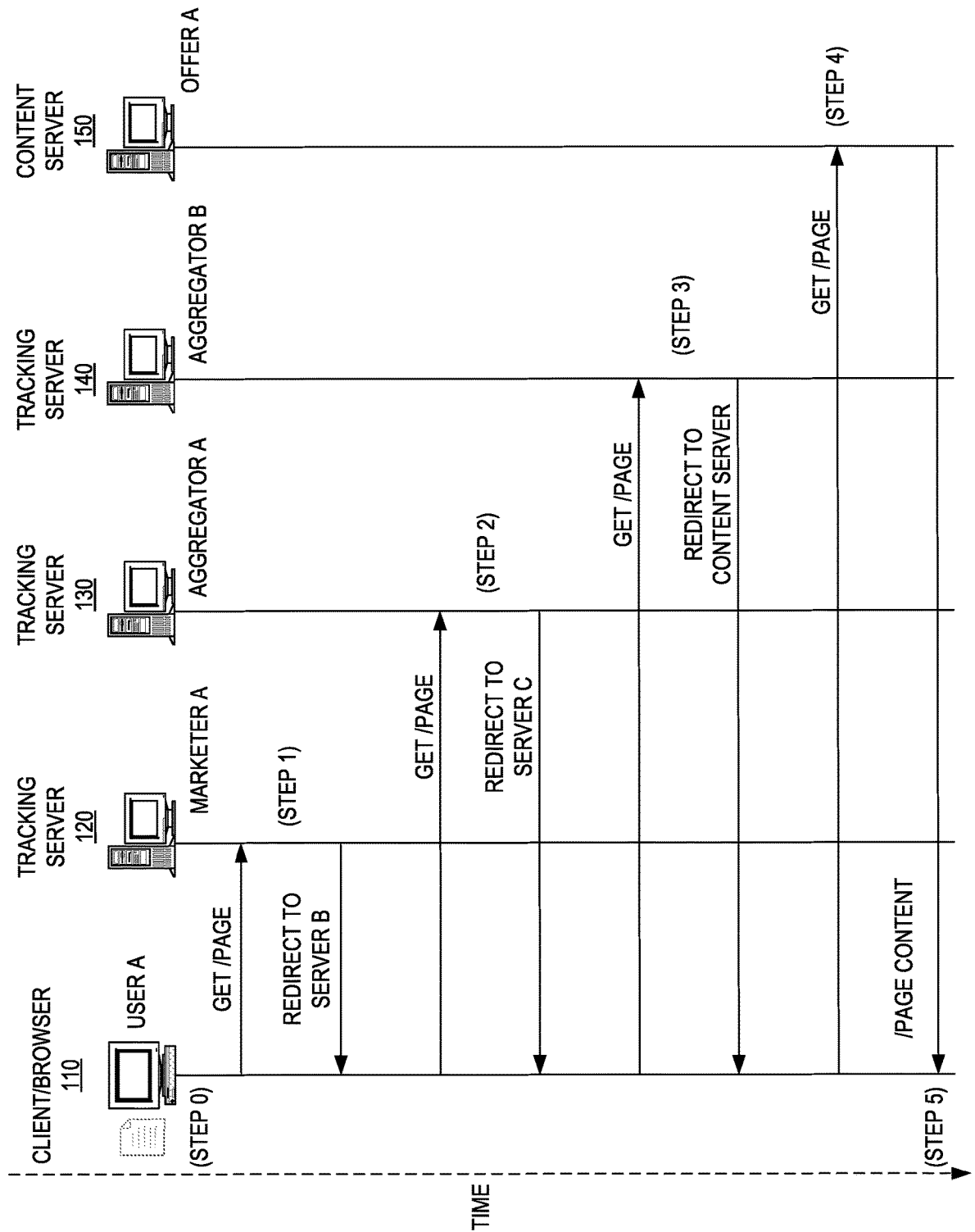
FIG. 1 is an example diagram of a data flow for a redirect structure that may be encountered, such as in an online (i.e., Internet) commercial marketing scenario.

While the redirect mechanism in modern data network traffic protocols, such as the HyperText Transfer Protocol (HTTP) used by most Internet websites, provides a way of redirecting requests to different locations and/or resources on the data network in cases where the original resources at the original locations are not available or not up to date, these mechanisms may also be used for other purposes not readily apparent to the end users, and potentially may be used in unwanted ways. For example, many marketers, market aggregators, and the like, use redirects as a way of sharing revenue and tracking user traffic. Such redirects may also be used to gather content from a variety of different computing devices and compile them to generate a web page's content, e.g., obtaining advertisements and the like, from various different sources, and presenting them in separate portions of a web page. That is, a requested web page may have various different portions, each having a different redirect that goes to different computing devices to get content that is then rendered as part of the web page.

As an example, when a user clicks on a hyperlink on website A in order to visit website B, the user's web browser application may be redirected to website Y before going on to website B, allowing the website Y to track user traffic, such as by providing a first-party cookie or other tracking mechanism that can be used to recognize the user/browser when they navigate between other websites that redirect to website Y. Such mechanisms are implemented in modern distributed data processing systems as an alternative to third-party cookie mechanisms which require the user/browser to surreptitiously visit a third party website in order for that website to be able to install a third-party cookie on the browser application. Such third-party cooking mechanisms are increasingly being blocked by browsers and therefore not as successful in tracking user/browser activity for marketers or entities whose purpose is to track user/browser traffic, since most users are unlikely to manually enable third-party cookies. As a result, third party cookies are largely being phased out as more and more browser platforms such as Safari, Chrome, Firefox, and others disallow the use of such third party cookies. These browsers will fetch resources from anywhere to show a particular web page, but they no longer store cookies when the resource that wants to set the cookie lives in a server that is not the one in the main URL the browser fetches. Thus, marketing tracking of this type is slowly being phased out.

In contrast, the redirect mechanism provides a behind-the-scenes way of forcing such visits to websites in a manner that is unbeknownst to the user so that the entity that benefits from the visit and tracking of the user/browser traffic can install cookies or perform other tracking activities. The redirect mechanism allows first-party cookies to be placed on the browser since the browser is indeed connecting directly to the tracking server that is installing the cookie on the user's browser. The browser receives the cookies along with instructions to redirect the browser to a different URL.

However, with this arrangement, there may be unwanted leakage of sensitive data that, if obtained by competitors to the entities benefiting from the redirect mechanisms, may provide insights into the redirect structure that can be leveraged to obtain an unfair competitive advantage. That is, hyperlinks, or Internet links, may be used to track visitors and sales for various online websites and redirect users to a final destination through one or more intermediary computing systems and data network traffic steps. With each of these data network traffic steps, vital competitive information may be leaked about the economic structure, technological infrastructure, and market tracking activities of the marketers, aggregators, and the like. Furthermore these intermediate steps regularly become blocked by ad blocking databases.

FIG. 1 is an example diagram of a data flow for a redirect structure that may be encountered, such as in an online (i.e., Internet) commercial marketing scenario. As shown in FIG. 1, a user at a client computing device 110 may utilize a browser application to access content on a remote server computing device, such as a website. For example, a user may access a website having one or more webpages that themselves may have content with hyperlinks or other user selectable links that direct the browser application to other webpages and/or websites, files, or other content. When the user or an application on the client computing device interacts with the web browser to select the hyperlink, or "link", in accordance with the data network communication protocol, e.g., HTTP, a request is sent to a location specified in the link, e.g., a GET request is sent for the particular webpage or other content specified in a location header of the link. For example, a user may be presented with an advertisement for a product and may use their computer mouse or other peripheral device to "click" on or otherwise select the advertisement which causes the browser application to generate a request based on the hyperlink associated with the advertisement.

However, while the user of the client device 110 perceives this request being sent to the content provider associated with the selected webpage content or hyperlink, e.g., the product provider's website in the case of the advertisement example above, in actuality, the hyperlink may direct the request to a different location, such as the tracking server 120, which provides a redirect response to the browser application and at this time server 120 may place first-party tracking cookies to be stored by client device 110. Based on this redirect response, the browser application generates a new request directed to the redirect location specified in a header of the redirect response. This may happen multiple times, as depicted in FIG. 1, where multiple redirects occur between the browser application at the client computing device 120 and one or more other intermediate computing devices, e.g., tracking servers 120, 130, and 140, before reaching the content provider's computing device, e.g., content server 150. As these redirects may occur in milliseconds, even with multiple redirects occurring, they may not be discernible to the end user or may only slightly be discernable in that there may be a slight lag in accessing the content at the content server 150.

As the browser hops from redirect to redirect and server to server, e.g., the tracking servers 120-140 and then ultimately the content server 150, the servers record in their databases the URL parameters of the requests that they receive, where these parameters include all the information needed for sales tracking and other tracking functions, e.g., who sent the browser to that server, what the "offer" was that they were targeting, and the "click identifier" for the particular click of the user, for example. When the sale occurs, these server systems connect through "Postback URLs", or simply "postbacks", in reverse order and send the click identifiers up the stream, thereby informing the next upstream tracking server of which click identifier resulted in a sale. The process of postbacks continues backwards up the stream until the sale is registered on the initial marketer's tracking server. All of these hops and redirects, when being performed with the browser application, represent potential sources of sensitive data leakage about the particular structure of the marketing arrangements and computing system configurations that a potential competitor could leverage to obtain a competitive advantage.

The illustrative embodiments provide mechanisms for avoiding such sensitive data leakage when performing redirects in data network traffic by providing a mechanism for cloaking these redirects in a custom cloaking server located between the end user/web browser client computing device and the tracking servers 120-140 and content server 150. The redirect cloaking system of the illustrative embodiments cloak the redirects occurring before reaching the content server 150 such that the redirects are not forwarded to the web browser application executing on the client computing device and are not accessible to unauthorized parties via the cloaking server. From the viewpoint of the client computing device and its executing web browser, the web browser sends a request for content, such as in response to a user selecting a hyperlink or other portion of a web site or web page that links to a content server 150, and a single redirect is returned to the client computing device's web browser instructing it to go to the content server 150 and retrieve the requested content.

At the redirect cloaking system, the original request for content is intercepted by the cloaking server which acts as an intermediary for the client computing device and web browser such that redirects from tracking servers and the like are handled by the cloaking server without sending them back to the client computing device and web browser until a redirect to the content server is detected. This redirect to the content server is then forwarded to the client computing device's web browser which then accesses the content at the content server 150 with a subsequent forwarding of the request based on the redirect response.

Thus, the intermediary redirect responses from the tracking servers and the like are not forwarded to the client computing device and web browser and thus, the data leakage that may occur due to these redirects is avoided. That is, unauthorized parties are not able to gain access to the redirect structure and thus, not able to discern sensitive information from this redirect structure regarding marketing arrangements and the like, that would give an unfair competitive advantage to these unauthorized parties. Therefore, by integrating the cloaking server and its corresponding redirect cloaking system in the distributed data processing system architecture, a more secure architecture from unwanted leakage of sensitive data is achieved.

As will be apparent from the present description of the illustrative embodiments, the present invention may be a specifically configured computing system, configured with hardware and/or software that is itself specifically configured to implement the particular mechanisms and functionality described herein, a method implemented by the specifically configured computing system, and/or a computer program product comprising software logic that is loaded into a computing system to specifically configure the computing system to implement the mechanisms and functionality described herein. Whether recited as a system, method, or computer program product, it should be appreciated that the illustrative embodiments described herein are specifically directed to an improved computing tool and the methodology implemented by this improved computing tool. In particular, the improved computing tool of the illustrative embodiments specifically provides a redirect cloaking system that provides an improvement in security of distribute data processing system traffic by avoiding unwanted leakage of sensitive data or information that may occur when observing redirect responses received by a client computing device and its browser application. The improved computing tool implements mechanism and functionality, such as the redirect cloaking system, which cannot be practically performed by human beings either outside of, or with the assistance of, a technical environment, such as a mental process, method of organizing human activity, or the like. The improved computing tool provides a practical application of the methodology at least in that the improved computing tool provides an improved computer functionality that obfuscates the redirect structure of content provider web sites with regard to tracking servers and the like, such that unwanted parties cannot discern the redirect structure and other sensitive data from observation of the redirect responses returned to a client computing device. This is a specific improvement over prior systems which do not obfuscate the redirect structure and instead operate in a manner similar to that shown in FIG. 1 above.

Before continuing the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

As mentioned above, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As mentioned above, the illustrative embodiments provide a redirect cloaking system and cloaking server architecture that operates to obfuscate redirect structures occurring between client computing systems and tracking servers, content servers, and the like. The obfuscation makes it so that vital competitive information about the marketer economic arrangements, technological infrastructure, and marketing activities may be hidden from potential competitors so that they cannot get an unfair competitive advantage over the marketer.

To illustrate the need for such a mechanism, consider an example, redirect chain for a product sale hyperlink on a web page, with FIG. 1 in mind. The example will assume that a distributed data processing system is being utilized by a client computing device 110 to access content on one or more content servers 150, where this distributed data processing system comprises one or more data networks. In the example, the one or more data networks constitute the Internet which uses a communication protocol, such as HyperText Transfer Protocol (HTTP) or the like, to communicate between computing devices connected to the Internet. In accordance with this communication protocol, computing devices may send requests for accessing content of a server and may receive responses, where some of these responses may be redirect responses causing the computing devices to send subsequent requests to a different target computing device specified in the redirect response. In performing such redirects, additional intermediary computing devices may be provided to which the redirects are directed, as described previously and hereafter.

For example, these intermediary computing devices may be server computing devices that implement tracking platforms that operate to track user/browser activity, sales, and the like, and thus, these servers computing devices may be referred to as "tracking servers" herein. These tracking servers may in fact perform tracking functions for a plurality of different content providers and/or marketing campaigns of the same or different content providers. These content providers may offer products/services via one or more websites that market the content provider's products/services and thus, the computing devices or websites that provide the links to the content providers' content servers may be considered "marketers" of the content providers' products/services. Thus, the operators of these tracking servers may be considered "aggregators" as they aggregate tracking information for a plurality of different marketers and/or campaigns of the same or different marketers.

As shown in FIG. 1 and described hereafter, a request targeting particular content of a content provider may be generated in response to a user interfacing with a website or the like provided by a marketer. This request may, via the redirect chain mechanisms, traverse one or more "hops" from one tracking server to another before reaching the targeted marketer's content server. It should be appreciated that at each "hop" along this redirect chain, the tracking server does not know about the hops further along the redirect chain. Moreover, it should be appreciated that the marketer does not necessary do this redirect chain on purpose, but may have no other choice because the marketer does not have a business relationship closer to the actual content provider. There may be many reasons why the marketer may not have a business relationship closer to the actual content provider, e.g., lack of information, lack of clout to be able to work directly, lack of financing (sellers will often delay payments), greater financial risk (risk of non-payment from the seller), increased overhead, etc. Aggregators serve a function in this space in that they provide high-risk financing to content providers, they aggregate in a friendly interface the content, e.g., products/services/electronic content, of many content providers, and they advise marketers on contents, e.g., products, and trends. Even with marketers with large amounts of clout or that have direct relationships with content providers, the marketers will often work with aggregators in order to distribute the risk of non-payment.

With reference to FIG. 1, in the depicted example, as an initial step (Step 0), "User A" may use their client computing device 110, and a browser application executing on the client computing device 110, to navigate to a web page on a web page at "http://notarealdomain.null/page.php". User A is presented content of the web page via their browser application, which may include hyperlinks, graphical elements with embedded hyperlinks, or the like, as is generally known in the art. User A may interact with the web page via their browser application and the user interface elements of the browser application, such as by clicking, tapping, or otherwise activating a hyperlink from "Marketer A". For example, the web page may have an advertisement of interest to the user and the user may click on the advertisement that then causes an associated hyperlink to be populated in the browser applications' navigation bar and causes the browser application to send a request to that hyperlink's network location, i.e., the computing device storing the content associated with that hyperlink's network location.

The initial hyperlink (or simply "link") from Marketer A may be of various types and may have various parameters, an example being of the type "https://xkarmasaintsx.null/?a=1234&c=567&s2=ABCDE". In a next step (Step 1) of the process, when User A's browser application follows this link, such as by causing the browser to send a request directed to the location specified by the link, the server computing device 120 at the destination responds with a redirect response, having a corresponding redirect code, that indicates a redirect to another network location. This code may be in the form of HTTP Codes, header refresh information, executable Javascript™, or other ways of conveying to the browser application executing on the client computing device 110 to follow a redirection. The redirect response specifies this code the network location of another computing device to which the browser application is to navigate by sending another request targeting this new network location specified in the redirect response.

In a next step (Step 2), the server computing device 120 may redirect the request to another internal web page hosted by the same computing device 120, such as in the case of an aggregator that implements multiple tracking platforms and chains them together or the tracking platform uses an HTTP redirect to send the request from one part of the tracking server system to another. Whether or not the server computing device 120 which itself may return redirect response to this request to thereby redirect the browser application, or simply "browser", to yet another intermediate server computing device 130, e.g., by using a redirect response with a new network location specified as https://scrubzone.null/?a=1234&c=567&s2=ABCDE&ckmguid=dc80c3bb-9b89-46cb-937d-5ec24458d9af. This intermediate server computing device 130, upon receiving the redirected request from the client computing device 110, may then return a redirect response to the browser instructing it to send the request to another computing device 140, in the next step (Step 3) to the server computing device 140 at network location "https://noprofit.null/?a=555&c=37&s1=1234&s2=94734349", for example. This server computing device 140 may then, in a next step (Step 4) redirect the browser of client device 110 to the content server 150, such as at "http://trk.belgradexer.null/aff_c?offer_id=18&aff_id=1035&aff_sub2=97056404&aff_sub3=1234", for example. As part of Step 4, the browser sends a request to the content server 150 based on the redirect response, and then, in the next step (Step 5), the content server 150 provides the content at its internal network location, e.g., "https://hereisyourpage.null/v1/?CID=18&AFID=1035& SID=&click_id=102e5a78ec468aa54df3e9e4a364a3&aff_click_id=97056404", for example, to the client computing device 110 for output to the user via the browser application.

Consider an example scenario in which a marketer provides a web page of a marketer, such as "https://www.exclusiveconsumerdiscount.com/savenow/v2/", in which there is an advertisement for a blender that a content provider (or product provider in this case) is trying to sell through a marketing campaign providing free shipping and/or a discount on the product. The marketer gets paid a fee for marketing the product for the product provider, e.g., a fixed value of $25 per sale. The product provider may operate with an aggregator that has a tracking server from a Software as a Service (SaaS) platform, and the aggregator may provide a URL to which the aggregator wants the marketer to redirect requests, e.g., the aggregator may provide a URL link for the marketer's use, such as "https://www.an509trk.com/3J67C/2CTPL/". When the marketer redirects users/browsers to that link, any sales that take place will be attributed back to the marketer's account with the aggregator and the corresponding fee will be paid to the marketer.

The product provider may operate with several aggregators as "affiliate networks", each of which may have their own URL links associated with accounts with the product provider. Thus, for example, an aggregator may operate with another aggregator implementing the same or a different tracking platform and this different tracking platform may generate a separate URL link for the product provider, e.g., the aggregator may operate with another aggregator that uses the Everflow™ tracking platform (Everflow™ is a trademark of Everflow Technologies Inc.) which may generate a URL link for the product provider of https://www.rackboxes.null/5PF2QLW/FKK7916/. Still further, the aggregator may operate with yet a third aggregator, and this third aggregator may utilize a different tracking platform, e.g., Cake which operates as a SaaS tracking platform, which provides yet another URL link for the product provider of https://gmgtrax.null/?a=5763&c=29230, for example.

It should be appreciated again that each of the tracking platforms stores data structures for requests received that track the parameters of the requests. These data structures are used to track activity and also determine revenue sharing for sales that occur through the redirect chain.

For example, assume that the third aggregator, e.g., GrabAds, pays $20 per sale of the product from the product provider to the marketer, which is the same product that the first aggregator gets paid $25 per sale. Thus, what occurs with this redirect chain between aggregators is that when a "visitor", e.g., the user's browser, is sent by the marketer to the third aggregator, GrabAds, via the URL link redirecting to the third aggregator, the third aggregator will redirect the visitor to a link that the first aggregator gave them, similar to the one given to the marketer by the first aggregator. If the visitor buys the product, e.g., the blender, the first platform will tell the tracking platform that there was a sale and they owe the third aggregator, GrabAds, $25 for that sale. In turn, GrabAds will mark the "click" that the first aggregator sent them as having achieved a sale and that they owe the marketer $20. The third aggregator just realized a payment of $5. This may occur multiple times with layers of aggregators, each aggregator taking a portion of the revenue from the sale of the product/service or a portion of any other revenue gathered from accessing content via the content provider (product provider), e.g., two or more layers of aggregators.

At each of these steps (1)-(5), if the client computing device 110 and User A are potential competitors to Marketer A masquerading as regular customers, e.g., they are a second marketer, Marketer B, the potential competitor Marketer B may glean information about the economic relationships, technical infrastructure, and marketing structures used by Marketer A in order to devise their own economic relationships, technical infrastructure, and marketing structures to compete with Marketer A, e.g., by eliminating one or more of the "hops". For example, the potential competitor may record the requests and redirect responses received by their browser application, as well as other characteristics of the interactions between the various computing devices, to extract information that reveals the economic, technical and marketing structures used. Thus, the interaction between computing devices provides substantial data leakage of sensitive information that may provide an unfair competitive advantage to potential competitors that marketers do not want to reveal.

For example, from the above example interaction of computing devices 110-150 over steps (1)-(5), the following observations may be made from analyzing the request/response patterns and the data included in each of the requests/responses. In the example redirect chain described above with regard to steps (1)-(5) of FIG. 1, there are five primary actors:

Actor 1—User A who perceives the original web page and content associated with the original hyperlink, and is redirected upon selecting the content/hyperlink, e.g., by clicking, tapping or any other similar action;

Actor 2—Marketer A who placed this hyperlink for User A to follow in a suitable medium;

Actor 3—Aggregator A who is providing its links to Marketer A;

Actor 4—Aggregator B who is providing its links to Aggregator A; and

Actor 5—Offer A who is providing links to Aggregator B.

In Step 1, in the initial link presented to the user by a marketer "Marketer A", it may be determined that the domain "xkarmasaintsx.null" has been in use by a well-known aggregator, i.e., "Aggregator A". From this, it is known that the marketer who is showing this link to the client computing device's browser application, and thus User A through the capturing of the requests/responses and analyzing them, is connected to "Aggregator A" and has an account with "Aggregator A". Furthermore, the server computing system 130 in use by "Aggregator A" may be determined by simple fingerprinting to be a well-known tracking platform, e.g., referred to as the "Cake" tracking platform in this example. This may be determined by tracking the Internet Protocol (IP) address of the domain "xkarmasaintsx.null" back to one of the "Cake" company's IP address ranges or more simply by the use of URL variables because, in order to use the Cake tracking platform and other tracking platforms properly, URL parameters must have specific names and uses which end up further leaking structural competitive information. The Cake tracking platform, in this example, forces their users to use a parameter named "a" (the letter "a") to carry the unique identifier (ID) of the partner (or marketer) sending the visitor (e.g., user), in this case that value is "1234" and unequivocally identifies "Marketer A" inside the server computing system 130 of "Aggregator A". The Cake tracking platform may also force its users to use the campaign parameter "c" to specify the advertising or other marketing campaign ID inside the Cake tracking platform.

Even the relative values of these parameters leak valuable competitive information, for example Cake as well, as other SaaS used in the industry for tracking, force sequential values of parameters to be used. Thus, value "a" of 30 represents an older account in the particular Cake instance of an aggregator than an "a" value of 521. This not only identifies the marketer using Aggregator A across the whole of the internet, and across all links they obtain from Aggregator A, but it also signals the seniority of the marketer and, in some cases, can flag if the marketer is an internal account of the aggregator in cases of very low numbers under 10. The value of "c" in this and similar values in other platforms also leaks vital information by being predictably generated by the tracking platform. A low "c", or campaign ID value, in any tracking platform indicates that the system under analysis is most likely the final content owner or owner of the products simply because product owners tend to have less than a dozen products on offer, while aggregators have thousands. Since "c" and similar values are created sequentially as indexes in the SaaS platform tracking databases, one may discern aggregators from content owners and use this information as a competitive advantage by focusing efforts on obtaining products in the most direct route.

In Step 2 an internal redirect may be performed between two different domain names inside the Cake tracking platform. This redirect being an internal redirect may be determined because the value of the "a" and "c" parameters remain unchanged.

In Step 3 there is a redirect where the URL parameters get shuffled and this shuffling may be representative of a hand-off to another aggregator, "Aggregator B". From the URL parameters it can be seen that parameter "a" holds the value 555 and this means that "Aggregator A" is known as partner ID "555" inside of "Aggregator B" system. The "c" parameter, or campaign value, is now 37 for the "Aggregator B" system, and it can be determined that the original "a" value from "Aggregator A" is now placed into variable "s1" as value 1234.

In Step 4 there is a redirect to a different tracking platform. This time the platform is "HasOffers", and just like the Cake tracking platform and other tracking platforms, it can be identified by their forced use of URL parameters or other fingerprinting methods. In this example, the "HasOffers" tracking platform forces the use of the URL variable name "offer_id" for the internal ID of an offer, "aff_id" for partner/affiliate ID and "aff_sub", "aff_sub2" thru "aff_sub5" for extra parameters. HasOffers also forces these IDs (offer_id and aff_id) to be sequentially created into their database, further exposing vital information. It can be seen that "Aggregator B" must be known as partner number 1035 in the "HasOffers" tracking platform and the value of "s1" was moved over to variable "aff_sub3" with the value "1234".

In Step 5 there is a web page that requests user input and is the actual sales page of a product. This web page receives, from Step 4, the variable "AFID" with value 1035. This is the same value that Step 4 received from Step 3 in a different variable, thus it can be deduced that the data table used to map the value "1035" to a specific marketing partner is one and the same between Step 4 and Step 5. Thus, these two pages and computing systems are demonstrably controlled by the same entity. The entity, which is referred to as "Offer A", controlling Step 4 and Step 5 is therefore considered the actual owner of the web page where the sale takes place, with all the prior steps being intermediaries.

When products/services are finally sold, information is presented, or content is otherwise provided at the final web page in Step 5, any revenue generated may be attributed backwards along this same redirect chain. Thus, knowing the technical redirection chain will give insight into the economic connections between the actors and partners. In a competitive landscape, it is very valuable to cut out intermediaries and connect as directly as possibly to the source of a product/service, information, or content. Thus, this redirect chain is full of sensitive information that if ascertainable by potential competitors could potentially provide an unfair competitive advantage. For example, the redirect chain shows there is a direct relationship between Marketer A and Aggregator A, and between Aggregator A and Aggregator B, and then between Aggregator B and Offer A.

For example, consider another marketer, i.e., "Marketer B", to be a new entrant into this environment. If Marketer B wanted to compete directly against Marketer A, all that Marketer B needs to do is take a look at this redirect chain and cut out one or both of the aggregators, i.e., Aggregator A and/or Aggregator B. Depending on their knowledge or connections, Marketer B might be able to bypass Aggregator A and go straight to Aggregator B to obtain Offer A, or they might be able to go directly to Offer A at Step 4, cutting out two layers of intermediaries. Each intermediary in this redirect chain will take a negotiated portion of any revenues, e.g., 10% to 20%, generated by the sale of the end product/service, use of information, or presentation of content. Thus, the incentive to bypass the aggregators is strong and the difference in revenue can be decisive in determining if Marketer A or Marketer B dominates this market.

The present invention provides a mechanism to hide some or all of these intermediate steps, and to alter the final output presented to the intermediaries as well as the end user. With regard to hiding information from the end user, the end user's browser does not see the complete redirect chain, or in some cases any of the redirect chain, and thus, the browser, or a network analyzer collocated with the browser, cannot be used to gather sensitive information about the redirect chain. With regard to hiding information from the intermediaries, the intermediators, e.g., aggregators, receive connections from a cloaking server of the illustrative embodiments, for every "visitor" regardless of where the visitor is coming from and the cloaking server alters the browser request from the visitor to add a header that informs the next intermediary computing device in the redirect chain the originating address of the browser and does not pass any cookies along. The cloaking server and redirect cloaking mechanisms of the illustrative embodiments may make other modifications of the requests/responses as desired for the particular implementation, to ensure that the redirect chain is cloaked and sensitive information associated with the redirect chain structure is masked from potential unauthorized parties, while still tracking activities, such as sales, properly.

In addition to the benefits of hiding sensitive information of the redirect chain structures, the illustrative embodiments achieve additional benefits due to the cloaking mechanisms. For example, with the mechanisms of the illustrative embodiments, redirects are accelerated for end users (browsers). The cloaking server and redirect cloaking mechanisms process requests to the same intermediate servers over and over again and cache the IP address of these servers which reduces the Domain Name Service (DNS) lookup times from an average of approximately 80 milliseconds each to 0 milliseconds, as this data is fetched from the cloaking server's cache. In addition, the cloaking server sits on a high speed connection at centrally located data centers, which are the same or very close to the datacenters the tracking platforms use. As a result, the connections and data transfers between the cloaking server and the servers of aggregators implementing the tracking platforms and offer owners (content/product providers) happen at a relatively faster speeds than if they were sending data back and forth repeatedly to an end-user's client device, such as a mobile phone over cellular or a desktop thru Digital Subscriber Line (DSL) or other relatively slow Internet connection. Furthermore, the TCP/IP protocol allows for connection re-use and thus, the cloaking server keeps connections open to servers and re-uses them, thus saving time in setting up TCP connections.

In addition to these benefits, the cloaking server and redirect cloaking mechanisms of the illustrative embodiments provide significant benefits to marketers. Marketers find that their tracking, aggregator, etc. domains become blacklisted by antivirus software, web filtering software and even web browsers themselves flagging a site or domain as "malicious" even though all they have is a harmless product page or a tracking system. There are many entities that will report and flag legitimate advertisements and report the sites as malware, phishing, spam, etc. for any number of reasons other than the site actually having anything to do with malware, phishing, spam, etc. With the mechanisms of the illustrative embodiments, the names, addresses, URLs and information of all these intermediate servers are never seen and evaluated by the web browser or any antivirus software or firewall or filter residing at the end user endpoint, any corporate cloaking or filtering, which results in the marketer that is using the mechanisms of one or more of the illustrative embodiments of the present invention being able to bypass any blacklisting of the domains of the intermediate redirects and their marketing campaigns will continue to function unhindered. Another marketer not utilizing the mechanisms of one or more of the illustrative embodiments will find that when they tell a user's browser to follow the normal redirect chain, some of the users will be stopped midway by their antivirus software, web filtering or their browser considering the intermediate site unsafe. The net result is that a marketer using the mechanisms of the illustrative embodiments will receive a greater yield of revenue from the same amount of users.

Figure 2:
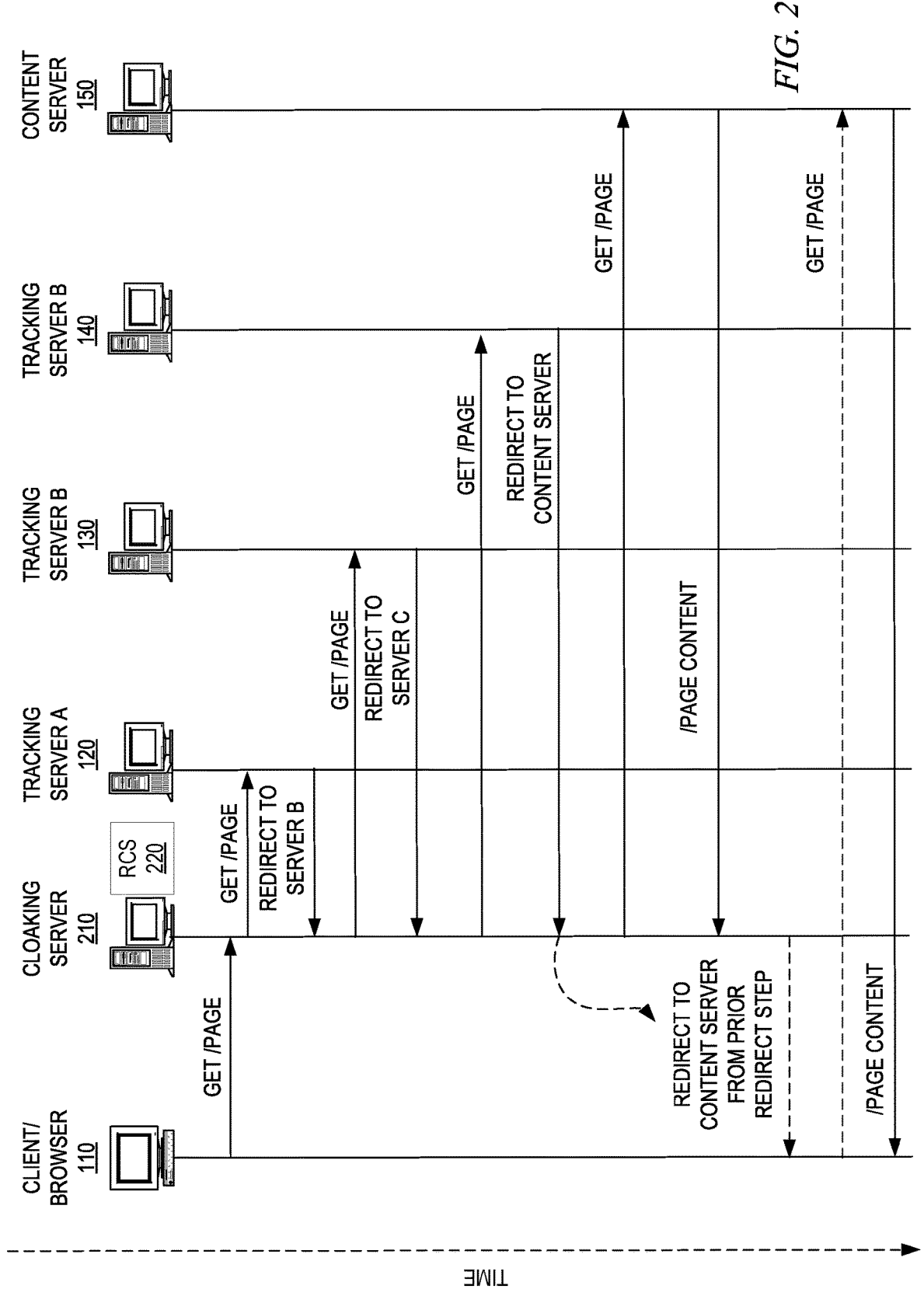
FIG. 2 is an example diagram of a data flow for a cloaked redirect structure in accordance with one illustrative embodiment.

FIG. 2 is an example diagram of a data flow for a cloaked redirect structure in accordance with one illustrative embodiment. As shown in FIG. 2, a cloaking server 210, that includes a redirect cloaking system (RCS) 220, is provided as an intermediary between the client computing system 110 with its browser application, and the other intermediaries 120-140, such that the redirect chain structure of these intermediaries 120-140 is not made visible to the user of client device 110 or any other interloper that may be monitoring the requests/responses exchanged with client device 110. It should be appreciated that, in this example, rather than requiring any change on the client computing system 110 or in the browser application, the redirect cloaking system (RCS) 220 is provided on a separate computing device, i.e., cloaking server 210. Thus, the client computing system 110 never sees the full redirect chain that exists on the "other side" of the cloaking server 210.

It should be appreciated, that in performing its operations to obfuscate or "cloak" the full redirect chain, the redirect cloaking system (RCS) 220 comprises logic that is able to interpret and follow all redirect types, such as HTTP codes, Meta Headers, Javascript, and is able to parse resources for links. Moreover, the redirect cloaking system (RCS) 220 comprises logic that operates, at its discretion, to use various header standards to forward the address, such as an Internet Protocol (IP) address, of the incoming request into the outgoing requests.

With the illustrative embodiments of the present invention, in its most basic form, the redirect cloaking system (RCS) 220 receives a request for a resource, e.g., specified in a URL or the like, that is assumed will result in at least one redirection to a final destination, and instead of returning that very first redirection, the redirect cloaking system (RCS) 220 follows the redirect chain, or at least a portion of the redirect chain, until it reaches a final destination by returning to the browser application, via the cloaking server 210, either a redirection request sending the browser to the content server 150 or sends the actual content of the final destination, i.e., content from content server 150, while skipping returning to the client computing system 210 any of the intermediary steps. Thus, what is seen at the client computing system 110, and on the data network connections to the client computing system 110, is that there was a request sent at Step 1 and that the server at Step 1 responded with a redirect to the URL of Step 5 directly or returns the content from the content server directly. No intermediate steps are visible to the client computing system 110 or the user. That is, at least in some illustrative embodiments, the redirect cloaking system (RCS) 220 residing on the cloaking server 210 at Step 1, from the viewpoint of the client computing system 110, obfuscates the intermediate steps (2)-(4) by collapsing the redirect chain to a single step comprising a redirect to the final destination and/or presentation of the requested content. This irrevocably hides from the end user, and any competing marketers, all competitive information that could be extracted by observing the redirect chain.

In some illustrative embodiments, the redirect cloaking system (RCS) 220 returns a redirect response to the client computing device 110 and its browser application at any desired step prior to the step accessing the content server 150. This may be accomplished by the redirect cloaking system (RCS) 220 on the cloaking server 210, in some illustrative embodiments, by the tracking server 120 returning along with the redirect response, a URL parameter of the redirect location, or other source of information in the redirect response, that specifies how many steps will need to be followed in the redirect chain before reaching the content server 150 or how many steps or "hops" to "skip" in the redirect chain before returning redirects to the browser application at the client computing device 110.

In other illustrative embodiments, the redirect cloaking system (RCS) 220 may monitor the redirect chains associated with the various intermediaries, e.g., tracking servers 120-140, and predict a number of steps for a current request, e.g., determine an average number of steps, a minimum number of steps, a maximum number of steps, or any other suitable measure of the number of steps that will be likely to be encountered as part of the redirect chain based on previous request processing performed with regard to the same aggregator(s). For example, the cloaking server 210 and the redirect cloaking system (RCS) 220 may maintain a history of a number of "hops" associated with the aggregators and use this information to predict a number of "hops" that will be present in a redirect chain in which that aggregator is present based on this history, e.g., if the average number of hops for this aggregator is 3, then then number of redirects that the cloaking server and redirect cloaking system (RCS) 220 may use may be 3, or 1 less in order to redirect the web browser to the last tracking server in the redirect chain. Alternatively, specific redirect chain depth values may be stored for particular content servers 150 and a lookup of these redirect chain depth values may be used to determine the number of hops to traverse before returning redirects to intermediary servers 120-140 or URL links to the content server 150 to the client/browser 110. Thus, based on the predicted number of steps that the original request will require before reaching the content server 150, the redirect cloaking system (RCS) 220 may determine a particular step at which to start returning redirect response(s) to the client computing device 110.

In some illustrative embodiments, the invention returns a redirect to any step prior to the last one by automatically detecting when it should stop cloaking the redirects. For example, in one illustrative embodiment, the redirect cloaking system (RCS) 220 may traverse the entire redirect chain all the way to the content server 150 and may then go back one step and redirect the client/browser 110 to that redirect, i.e., the tracking server closest to the content server 150. In some cases, the final URL link to the content server 150 may be provided inside a string of a parameter of a response to the client/browser 110, and not as an actual redirect.

As noted above, in some illustrative embodiments, the redirect cloaking system (RCS) 220 operates to return a redirect response to the client computing device that is either a last redirect in the chain that redirects the client computing device's browser application to send a request to the content server 150, or in some illustrative embodiments, is an earlier redirect response in the redirect chain that is determined based on a depth prediction, or otherwise specified depth value, of the redirect chain, an automatic detection of a stopping criteria having been met, or a determination based on a URL parameter or other source of information in a redirect response. As also touched upon above, in some illustrative embodiments, the redirect cloaking system (RCS) 220 may, instead of returning a redirect response to the browser application at the client computing device 110, follow the redirect chain up to receiving the actual content from the content server 150 and may operate to return the actual content, or resource, at the end of the redirect chain. Thus, in this case, no redirects are returned to the browser application at the client computing device 110 and instead, from the viewpoint of the browser application, it sends a request and receives the requested content/resource.

In some illustrative embodiments, the redirect cloaking system (RCS) 220 operates on a sub-segment of a URL. For example, if a URL were formatted as follows "http://nodomain.null/red.php?url=http://offer1.com/" the redirect cloaking system (RCS) 220 may operate only on the predetermined parameter "url" and thus, return "http://nodomain.com/red.php?url=http://destination.com/". The redirect cloaking system (RCS) 220 sits in front of a tracking system of the cloaking server 210 such that the URL string is maintained in the tracking system, e.g., https://viewworld.null/adv.php?lpc={cachebuster}&fold_type=param&city={city}&state={region}&name=NutriBlend+X&img=nutriblend_x_trial.png&url=https://amkt. null/?a=1234&c=128626&52={clickid}&fold=1. For example, the tracking system of the cloaking server 210 redirects a browser 110 to URLs where the web pages of advertisements reside. In one illustrative embodiment, the URL string is returned in the form of a 302 HTTP header redirect by the tracking system of the redirect cloaking system (RCS) 220 to the browser 110 when the browser 110 is requesting a particular marketing campaign. The cloaking server 210 and the redirect cloaking system (RCS) 220 detects that from the side of the servers there is a URL parameter called "fold_type" with value "param". The redirect cloaking system (RCS) 220 parses the requests and URLs and, once the redirect cloaking system (RCS) 220 identifies these parameters in the URL, the redirect cloaking system (RCS) will look for the "url" parameter in this same string and operate on that substring, e.g., the substring "https://amkt.null/ ?a=1234&c=128626&52={clickid}&fold=1" in this example.

The redirect cloaking system (RCS) 220 collapses that URL into the final URL pointed to at the end of the redirect chain. Once the redirect cloaking system (RCS) 220 obtains that final URL, in this case the final URL "http://finalpage.null/thepage.html", for example, the redirect cloaking system (RCS) 220 modifies the string that it intercepted from the tracking system of the cloaking server 210 before passing it to the browser by removing the fold_type parameter and value, and replacing the value in the parameter url with the actual URL of the final page. Thus, in accordance with this illustrative embodiment, the redirect cloaking system (RCS) 220 on cloaking server 210 will return to the client/browser 110 a 302 HTTP header redirect pointing to https://viewworld.null/adv.php?lpc={cachebuster} & city={city} & state={region} &na me=NutriBlend+ X&img=nutriblend_x_trial.png&url=http://finalpage.null/ thepage.ht ml, for example. In this example of this illustrative embodiment, the cloaking server 210 is sitting on the same place on the distributed data processing system, e.g., the Internet, as in other illustrative embodiments, but instead of operating on the user's request to collapse the redirect chain, the cloaking server 210 and the redirect cloaking system (RCS) 220 operate on the returned data from the tracking system of the cloaking server 210.

It should be appreciated that in the illustrative embodiments, the redirect cloaking system (RCS) 220 operates to alter the content it sends in the initial, intermediate, and final redirect steps to suit the marketer's purposes, being able to alter the data it sends towards other servers as well as alter the data it is returning to the browser. That is, in the illustrative embodiments, the redirect cloaking system (RCS) 220 and the cloaking server 210 operate as a "man-in-the-middle" which allows them to change or delete the values of cookies being sent to tracking servers 120-140 and also data and cookies being sent for storage and display to the browser 110. This can be done by the redirect cloaking system (RCS) 220 and the cloaking server 210 iteratively without the user/browser 110 seeing intermediate steps.

Figure 3:
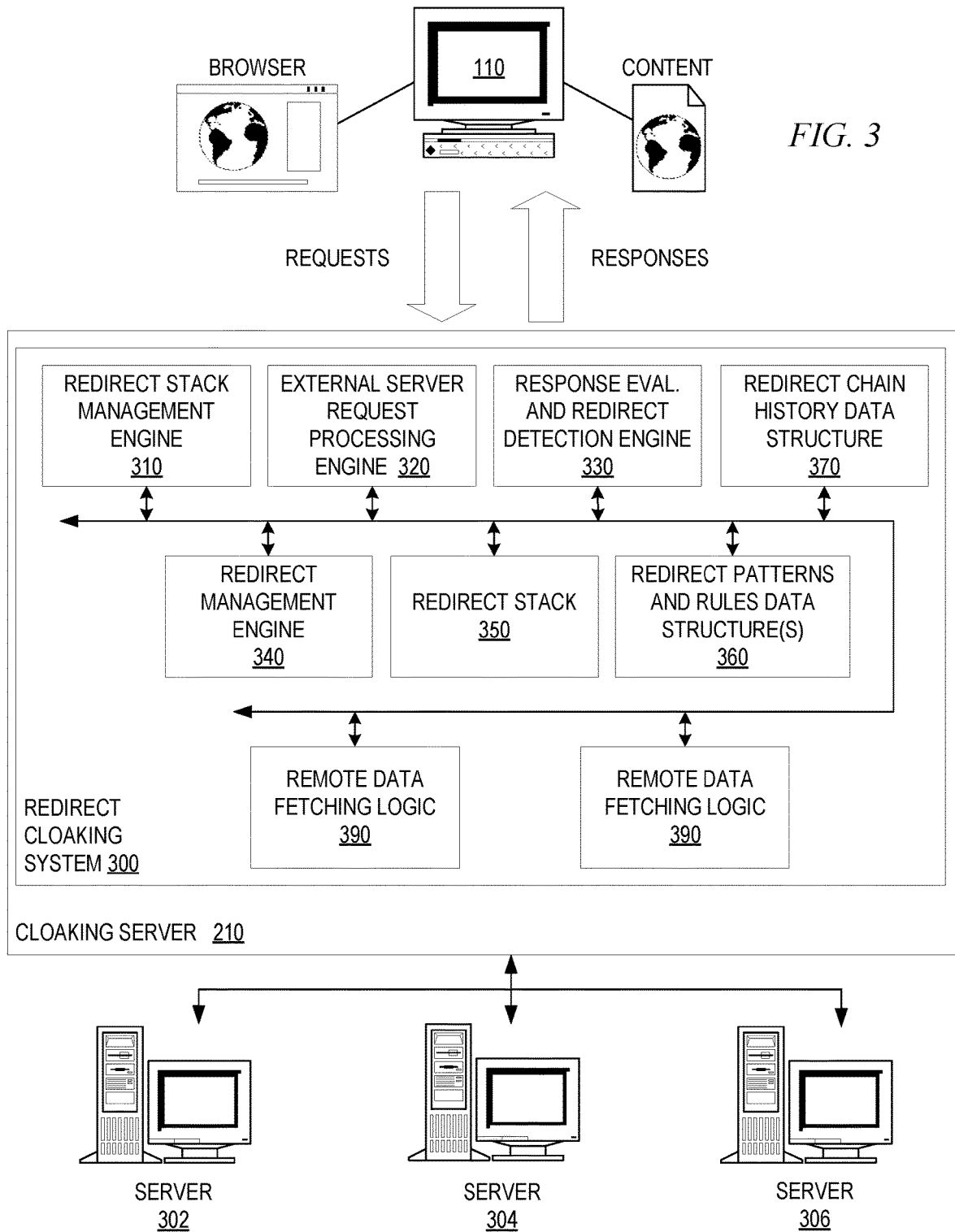
FIG. 3 is an example block diagram of the primary operational components of a redirect cloaking system of a cloaking server in accordance with one illustrative embodiment.

FIG. 3 is an example block diagram of the primary operational components of a redirect cloaking system of a cloaking server in accordance with one illustrative embodiment. As shown in FIG. 3, the redirect cloaking system (RCS) 300 comprises a redirect stack management engine 310, an external server request processing engine 320, a response evaluation and redirect detection engine 330, and redirect management engine 340, which operate with regard to a redirect stack 350, a redirect patterns and rules data structure 360, and a redirect chain history data structure 370. The RCS 300 has other communication logic 380 and remote data fetching logic 390 that operate in a manner generally known in the art for communicating via one or more data networks with client computing devices and browser applications 110 by opening and maintaining sockets, and requesting/accessing data provided by remotely located server computing devices 302-306. It should be appreciated that the RCS 300 may be provided as part of a cloaking server, such as cloaking server 210 in FIG. 2.

As described previously, the RCS 300 receives requests from clients/browsers 110 and operates to cloak any redirect chains associated with the processing of such requests and providing the requested content. Thus, redirects to various tracking systems of server computing devices 302-306 may be cloaked according to one or more of the illustrative embodiments previously discussed above with regard to FIG. 2. In doing so, as requests are received and responses are received the requests and redirect responses received are placed by the redirect stack management engine 310 on the redirect stack 350 for the particular open socket. Thus, there may be a separate redirect stack 350 for each open socket being handled by the RCS 300. Requests, and redirect requests generated as a result of a redirect response being received, are sent to their respective target external servers 302-306 via the remote data fetching logic 390 and responses are evaluated to determine if they are redirect responses.

That is, when a response is received, the response evaluation and redirect detection engine 330 determines if the response is a redirect response. This determination may involve looking at header information in the response to identify particular indicators of a redirect which may be specific redirect status codes or other parameters that are known to specify a redirect response, or may even be specific patterns that a particular customer uses to provide redirect responses. For example, the response evaluation and redirect detection engine 330 may first evaluate the HTTP header information to determine if the HTTP header includes a status code corresponding to a redirect, e.g., a 301 code or the like. There may be multiple different status codes that the response evaluation and redirect detection engine 330 looks for in the header information of the response. The response evaluation and redirect detection engine 330 may also look to the header information to determine if the response is a refresh redirect.

In addition, or alternatively, the response evaluation and redirect detection engine 330 may operate to look for particular patterns of parameters and/or parameter values in the header information that are indicative of a redirect response. For example, the redirect patterns and rules data structure 360 may store known patterns of parameters/values indicative of redirect patterns as well as executable rules that may be executed by the response evaluation and redirect detection engine 330 to determine if particular patterns of parameters/values are present in the response header information and determine a classification of the response as to whether or not it is a redirect response. It should be appreciated that this redirect pattern information may be specified for different communication protocols, scripts, and/or codings, e.g., there may be patterns for HyperText Markup Language (HTML), Javascript, and/or the like.

In response to the response being determined to be a redirect, the redirect management engine 340 may operate to add a redirect request to the redirect stack 350 and forward the redirect to its target external server 302-306 without returning the redirect to the client/browser 110. This may be done with regard to each response determined to be a redirect until it is determined that a response that is not a redirect is encountered, i.e., the response evaluation and redirect detection engine 330 does not identify the response as being a redirect. In such a case, if the response is not a redirect, then either the response, which would contain the requested content, is returned to the client/browser 110, or in some illustrative embodiments, the redirect management engine 340 operates to go back to an immediately previous response on the redirect stack 350 to redirect the client/ browser 110 to a last redirect in the redirect chain, such as when the content provider uses a tracking server to track activity/sales.

If the response is determined to be a redirect, then the redirect management engine 340 may parse the header information for the redirect URL using the redirect patterns and rules specified in the redirect patterns and rules data structure 360 which identify where in the header information the URL is present. This redirect URL may then be used to generate a request to that URL which is placed on the redirect stack 350 and processed similarly until a response is received that is not a redirect or a predetermined cloaking depth value is met or exceeded, as discussed hereafter. For example, once a non-redirect response is received, or a cloaking depth value is met or exceeded, then the redirect management engine 340 may send a response back to the client/browser 110 based on the entry at the top of the redirect stack 350, which may be a redirect or the content response from the content provider depending on the particular implementation.

It should be appreciated that in some illustrative embodiments, the response evaluations may be limited to a particular depth of the redirect chain, as may be specified by a parameter of the original request, or otherwise determined by the RCS 300 based on configuration information or a look-up or evaluation of the stored redirect chain history information in the redirect chain history data structure 370. For example, the redirect chain depth to which to cloak redirects, i.e., the cloaking depth value, may be specified in the original URL link, e.g., provided by the marketer as part of their web page, as a parameter/value. In other illustrative embodiments, the redirect management engine 340 may store redirect chain history information in the redirect chain history data structure 370 for various aggregators (or intermediaries) and/or content providers where this redirect chain history information may be the specific redirect chain parameters such that a specific redirect chain may be identified prior to traversing the redirect chain again, or the redirect depth parameter/value or a statistical value calculated based on the redirect depth parameter/value, e.g., the average, minimum, and/or maximum redirect chain depth, may be stored to identify parameters/values that may be used to estimate or set the cloaking depth value. For example, if it is known that this redirect chain has a depth of 3, then the cloaking depth value may be set to 2, or if the average redirect chain depth is 4, then the cloaking depth value may be set to 3 or 4 depending on the desired implementation.

Moreover, as previously mentioned above, in some illustrative embodiments the redirect management engine 340 may operate to process embedded URL parameters. That is, as noted above, the redirect management engine 340 may not only return a response to the client/browser 110 once a non-redirect is encountered or a cloaking depth value is met/exceeded, but may also modify the response to return to the requestor the URL string in the request at the top of the redirect stack 350 by embedding it into a custom "url" parameter. In still other illustrative embodiments, the redirect management engine 340 may alternatively modify the HTML of the response to replace the URL in the HTML with an output embedding the final URL form the top of the redirect stack 350. These various embodiments are further shown in FIGS. 4A-4D hereafter.

FIGS. 4A-4D show examples of various illustrative embodiments of the redirect cloaking system (RCS) of the present invention. The operations outlined in FIGS. 4A-4D with regard to the various illustrative embodiments are performed by the RCS which is a specifically configured cloaking server computing system operating between the client computing device(s) operating browser applications or the like, and the various servers, e.g., content servers and tracking servers. Thus, it should be appreciated that the operations shown in FIGS. 4A-4D are computer specific operations that are not capable of being performed manually and are not organizing any human activity. To the contrary, the depicted operations are specific to the handling of distributed data processing system requests and responses, and specifically redirect responses received from computing systems as part of a redirect chain involving multiple computing devices.

Figure 4A:
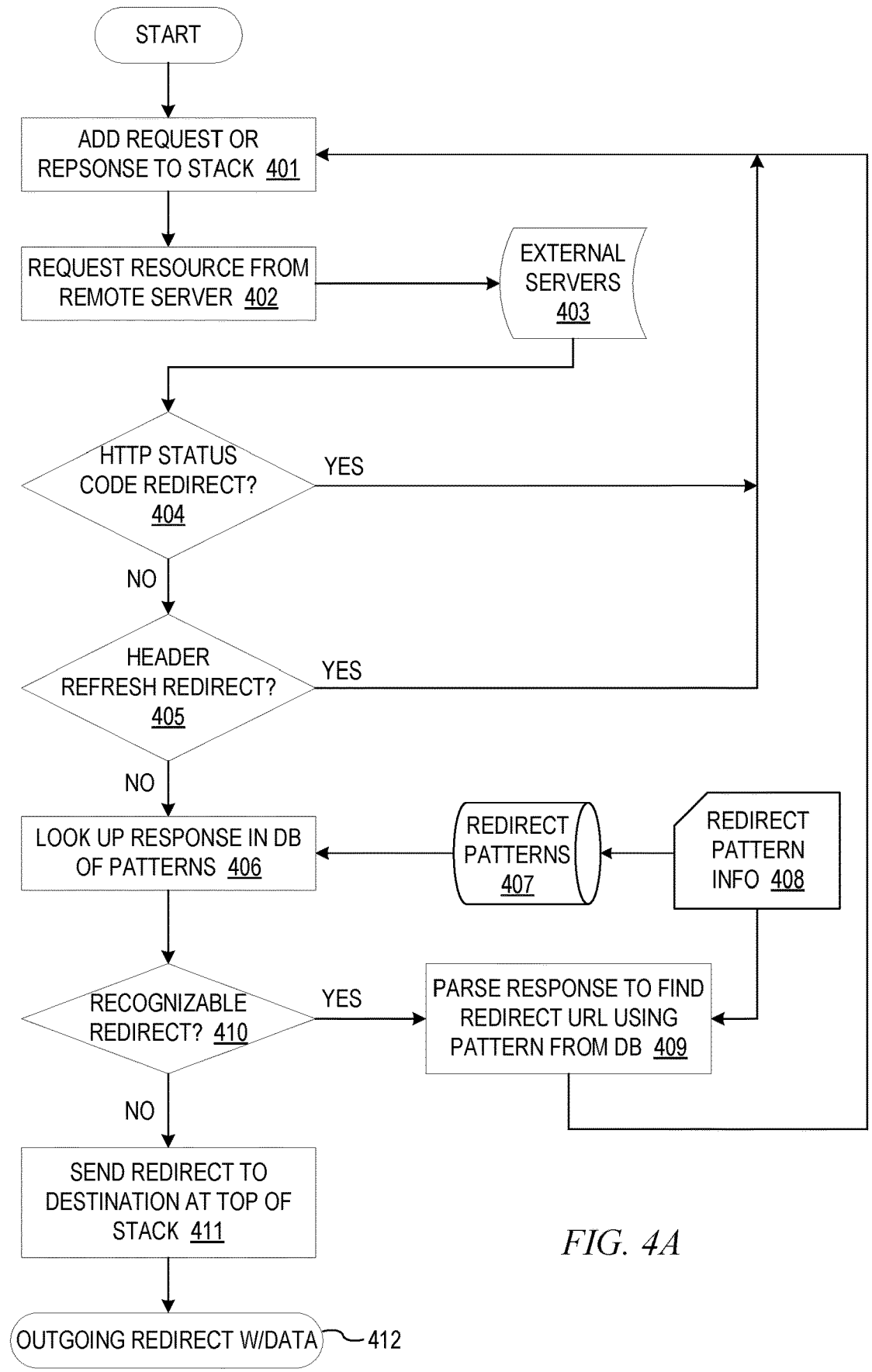
FIG. 4A is a flowchart outlining an example operation of a redirect cloaking system in accordance with one illustrative embodiment.

FIG. 4A is a flowchart outlining an example operation of a redirect cloaking system in accordance with one illustrative embodiment. As shown in FIG. 4A, the operation starts by receiving an incoming request and adding the request (or response in later stages) to the redirect stack (step 401). The request is then sent (step 402) to the external servers (step 403) to request the resource, e.g., content, from the external server. The external server returns a response which is then evaluate as to whether the response includes an HTTP status code that indicates the response to be a redirect (step 404). If so, then a request corresponding to the redirect is added to the redirect stack by return to step 401. If not, then the response is evaluated to determine if the response is a header refresh redirect (step 405). Again, if so, then a request corresponding to the redirect is added to the redirect stack and the request is sent to the target server for requesting a resource (steps 401-402). The generated redirect request is then processed through the flow of FIG. 4A accordingly.

If the response does not have an HTTP status code redirect or is not a refresh redirect, a lookup and/or pattern matching operation is performed by looking up the pattern of parameters/values in the header in the redirect pattern and rules database 360 (step 406) which stores patterns of regular expressions and rules for identifying redirect responses. As shown in FIG. 4A, in accordance with one illustrative embodiment, redirect pattern information 408 is provided as input to for customer defined HTML, and Javascript redirect patterns 407. The redirect pattern information 408 may also be utilized as part of a later step 409 in which the response is parsed to identify the redirect URL.

Based on the lookup and/or pattern matching operation 406, a determination is made as to whether the response is a recognized redirect (step 410). If so, then the response is parsed as noted above, to identify the redirect URL using the redirect pattern information 408 (step 409). A redirect request is then generated and added to the redirect stack by returning to step 401. If the response is not a redirect response, then a response to the requester is generated as a redirect to the destination specified in the entry at the top of the redirect stack (step 411). This generated response is then output to the requester (step 412) and the operation terminates.

Figure 4B:
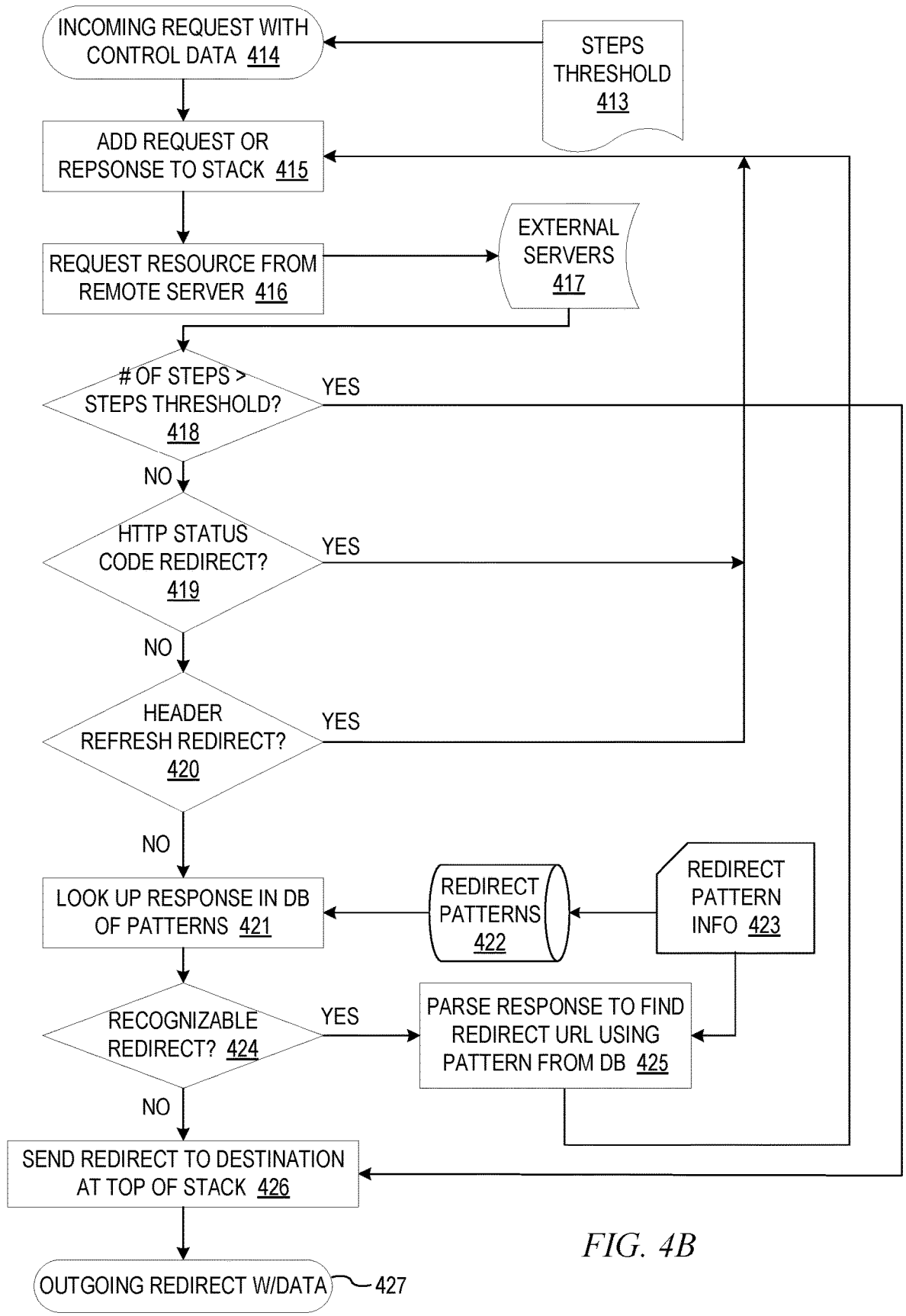
FIG. 4B is a flowchart outlining an example operation of a redirect cloaking system in accordance another illustrative embodiment in which a cloaking depth value is utilized.

FIG. 4B is a flowchart outlining an example operation of a redirect cloaking system in accordance another illustrative embodiment in which a cloaking depth value is utilized. The operation in FIG. 4B is similar to that of FIG. 4A but with additional considerations as to redirect chain depth and cloaking depth value, which is a number of steps over which to iterate the operation of FIG. 4B. In the particular embodiment shown in FIG. 4B, the cloaking depth value is specified in control data along with the request. This cloaking depth value may be specified as a number of steps to iterate 413, e.g., a control parameter in the request may specify a cloaking depth value of "3" indicating 3 iterations of the operation of FIG. 4B after which responses are sent to the requestor (client/browser). In other illustrative embodiments, this cloaking depth value may be determined from stored historical redirect chain information as previously described above.

As shown in FIG. 4B, the operation starts by receiving an incoming request having control data specifying a number of steps to iterate 413, i.e., a cloaking depth value (step 414). This request is added to the redirect stack (step 415). The request is then sent (step 412) to the external servers (step 417) to request the resource, e.g., content, from the external server. The external server returns a response and a determination is made as to whether this response represents a number of steps (or hops) along the redirect chain that is equal to or greater than the specified number of steps to iterate, i.e., the cloaking depth value (step 418). If so, then the operation jumps to step 426 where a redirect response is sent to the requester based on the destination specified in the entry at the top of the redirect stack. If not, then the response is evaluated similarly to FIG. 4A to determine if it is a redirect response or not. That is, the response may first be evaluated as to whether the response includes an HTTP status code that indicates the response to be a redirect (step 419). If so, then a request corresponding to the redirect is added to the redirect stack by return to step 415. If not, then the response is evaluated to determine if the response is a header refresh redirect (step 420). Again, if so, then a request corresponding to the redirect is added to the redirect stack and the request is sent to the target server for requesting a resource (steps 415-416). The generated redirect request is then processed through the flow of FIG. 4B accordingly.

If the response does not have an HTTP status code redirect or is not a refresh redirect, a lookup and/or pattern matching operation is performed by looking up the pattern of parameters/values in the header in the redirect pattern and rules database 360 (step 421) which stores patterns of regular expressions and rules for identifying redirect responses. As shown in FIG. 4B, in accordance with one illustrative embodiment, redirect pattern information 423 is provided as input to for customer defined HTML, and Javascript redirect patterns 422. The redirect pattern information 423 may also be utilized as part of a later step 425 in which the response is parsed to identify the redirect URL.

Based on the lookup and/or pattern matching operation 421, a determination is made as to whether the response is a recognized redirect (step 424). If so, then the response is parsed as noted above, to identify the redirect URL using the redirect pattern information 423 (step 425). A redirect request is then generated and added to the redirect stack by returning to step 415. If the response is not a redirect response, then a response to the requester is generated as a redirect to the destination specified in the entry at the top of the redirect stack (step 426). This generated response is then output to the requester (step 427) and the operation terminates. Thus, with this illustrative embodiment, either when the cloaking depth value is met or exceeded, or if the response is not a redirect request, then operation proceeds to step 426 and a response is returned to the requester.

Figure 4C:
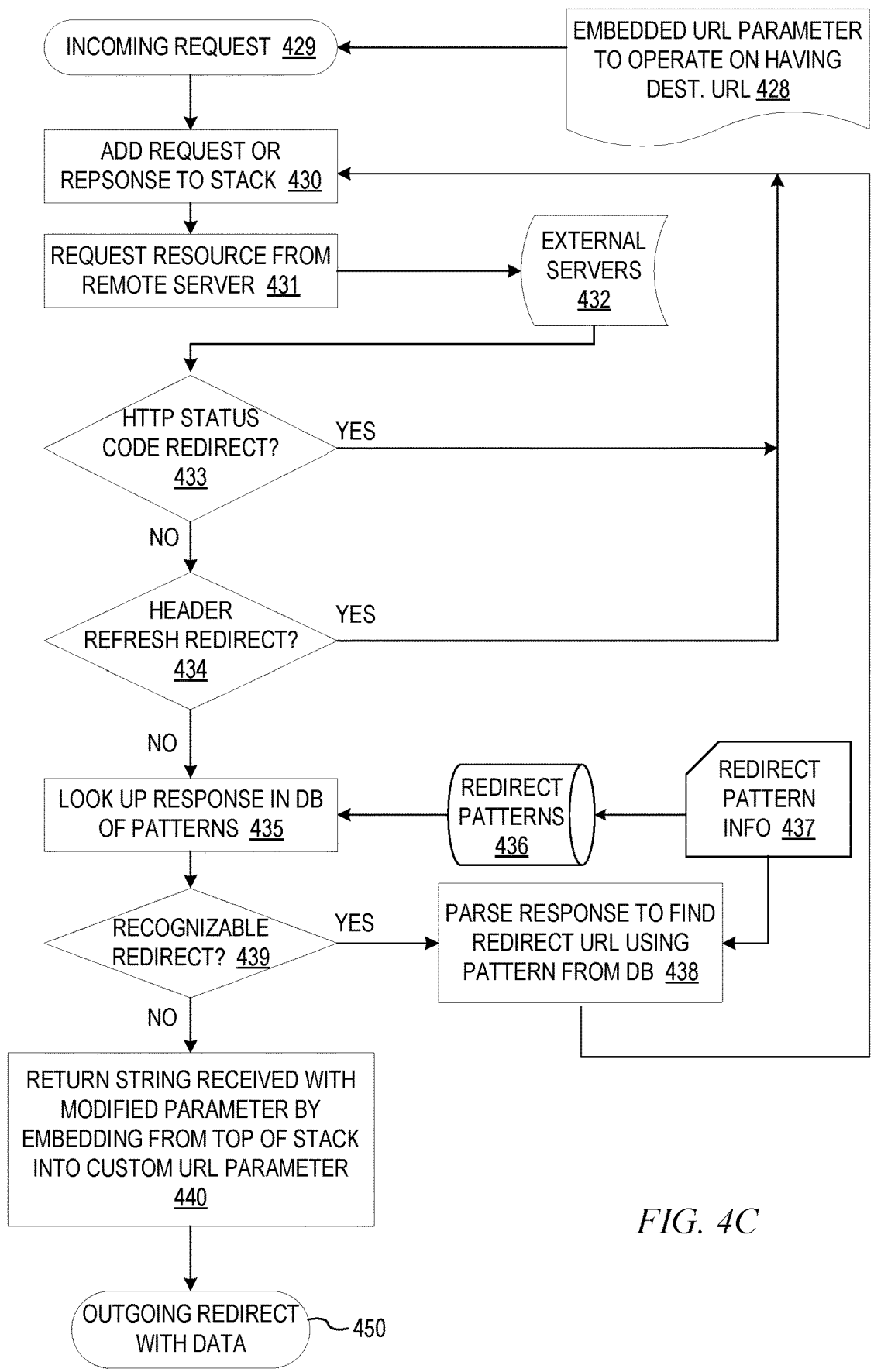
FIG. 4C is a flowchart outlining an example operation of a redirect cloaking system in accordance with another illustrative embodiment in which processing of an embedded URL parameter is utilized.

FIG. 4C is a flowchart outlining an example operation of a redirect cloaking system in accordance with another illustrative embodiment in which processing of an embedded URL parameter is utilized. The operation in FIG. 4C is similar to the operation in FIGS. 4A and 4B with the exception that the original request has an embedded URL parameter to operate on which contains a destination URL 428, and the response returned to the requester comprises an embedded URL from the top of the redirect stack in a custom URL parameter of the response to the requester in step 440. Thus, operations 430-439 are similar to corresponding operations of FIGS. 4A and 4B. In operation 440, the response is returned to the requester where the response has the string received with a modified parameter by embedding the URL from the top of the redirect stack into a custom URL parameter of the response.

The operation as illustrated in FIG. 4C may be used, for example, when showing Advertorials (Advertisement that look like editorials), which are often scrutinized by users through reading of the content in detail. As a result, the names and pictures of the products displayed need to match what is shown on the page or people will not buy the products. This poses a problem when you have an optimization SaaS platform that sends clicks to the best performing product based on earnings per click, for example. The problem is that the calculation of where to send the visitor happens after the user is done viewing the web page content, i.e., when they click on the link to the product, so while they are reading about "Product A for Skin" they might get sent to "Product B for Skin" which might be similar but it will sell less because it is not the same brand that the user read about. The normal way marketers tackle this is very tedious. For example, they create a pairing between a particular web page and a particular product link and that becomes the unit against which the algorithm optimizes. The tediousness comes from the fact that you have to clone and customize this web page for each and every single product one might have in a category; At the level of the web page HTML, one has no way of knowing where the user is going to go. These products are not static, they are constantly being added to, and they are also failing daily, such that a lot of effort is wasted.

The improved computing tool and improved computing tool operations of the illustrative embodiments solve this problem while not changing anything on current SaaS marketing tracking platforms. That is, the cloaking system of the illustrative embodiments, when it sees this particular URL pattern come back from a tracking server, it drills down and figures out where this particular user would wind up, and alters the parameter in the URL being sent back and that gets fed to the web page being displayed to the user as a URL parameter that is grabbed by Javascript running on the page. The Javascript puts that final URL in every place the user could click out to the offer. Thus, the user's web page no longer has a link inside its HTML that goes through all the tracking steps when clicked on, it has a link that goes directly to the content page with all the proper URL variables needed for sales tracking because the cloaking system of the illustrative embodiments already traversed the whole chain and is telling the web page where it needs to send the user directly instead of indirectly. When the URL parameter is populated, variables are added for the name of the product, and a URL for an image associated to it, so that the web page will display the same "Editorial" to every user but, using Javascript, will place the name, picture and final URL of the product at every mention. This process increases the speed at which new offers become live, while at the same time cloaking the redirect chain.

Figure 4D:
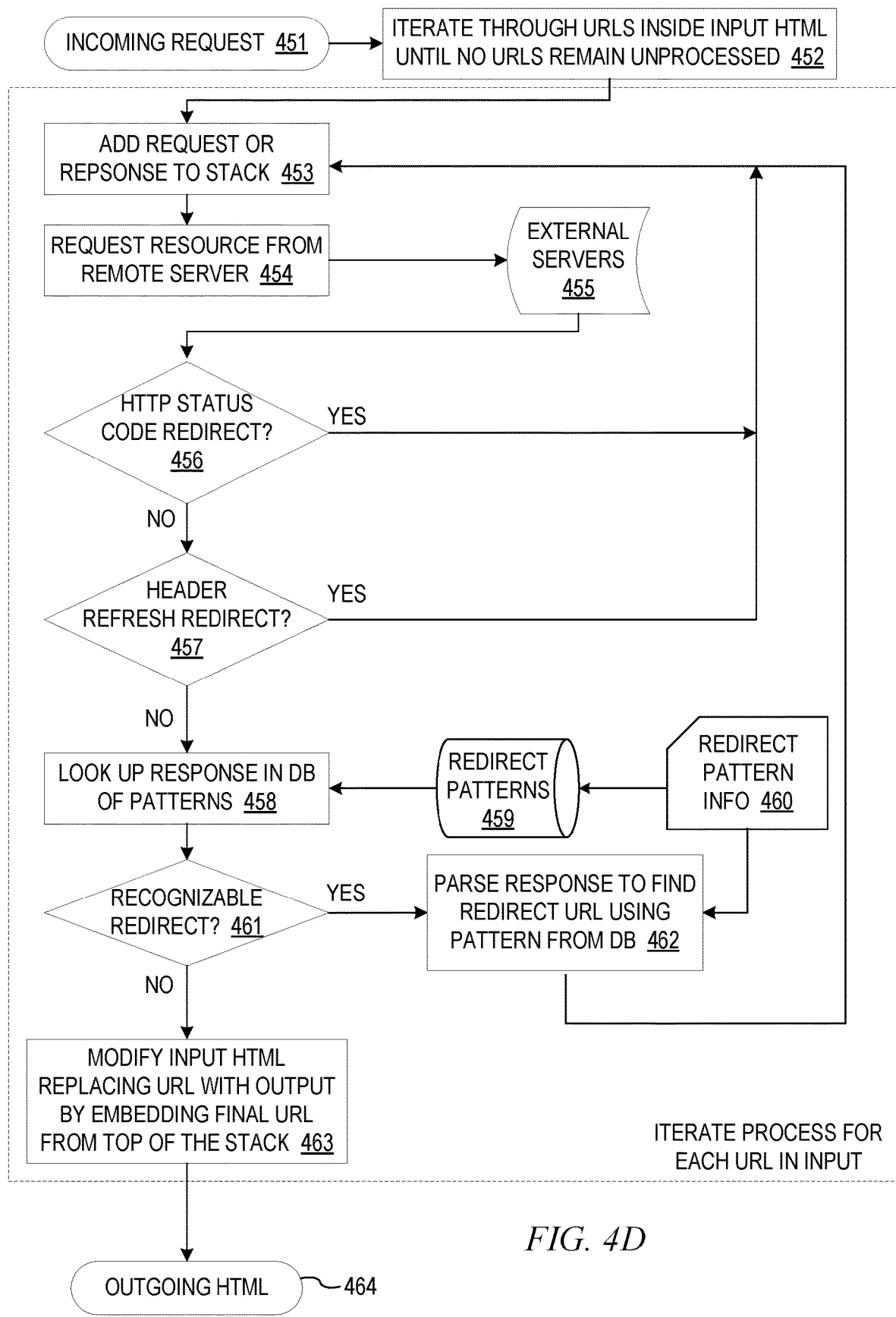
FIG. 4D is a flowchart outlining an example operation of a redirect cloaking system in accordance with another illustrative embodiment in which processing of HTML is utilized.

FIG. 4D is a flowchart outlining an example operation of a redirect cloaking system in accordance with another illustrative embodiment in which processing of HTML is utilized. In this illustrative embodiment, the incoming HTML may have multiple URLs and the redirect cloaking system (RCS) of the illustrative embodiments may iterate over all of the URLs in the input HTML until no URLs remain unprocessed through the operations of FIG. 4D.

As shown in FIG. 4D, the operation starts by receiving an incoming HTML (step 451). A process is initiated to iterate through the URLs inside the input HTML until no URL remains unprocessed (step 452). A request for the currently being processed URL is then added to the redirect stack (step 453) and the operations 454-461 are performed in a similar manner to corresponding operations of the other embodiments described above with regard to FIGS. 4A-4C. In step 463 during each iteration, the input HTML is modified to replace the URL in the HTML with the output of the process by embedding the final URL form the top of the redirect stack. Once all the URLs are processed in this manner, the final modified HTML is output to the requester (step 464) where the modified HTML has, for each original URL in the input HTML, the URLs replaced with the top of the stack URLs as in step 463.

With the illustrative embodiment of FIG. 4D, there is no limit to the amount of data that can be parsed. When taking and sending data using the URLs that a browser can request and receive, there are limits on the size of the URL. Google Chrome® (Chrome® is a registered trademark of Google, LLC), for example, will impose a 2 MB limit theoretically but, through experience, shows that anything beyond 2 KB (2048 characters) will often fail and even URLs exceeding 1024 characters can fail. Many firewalls, antivirus software and web filtering software will stop these extra-long URLs from working, thus if there is a need to parse and cloak multiple URLs, it needs to be done by feeding the HTML to the cloaking engine, instead of a URL parameter.

From the above description, it is clear that the illustrative embodiments provide an improved computing tool and improved computing tool operations that operate to solve the problems specifically present in distributed data processing systems with regard to data leakage due to redirect chains. As such, the illustrative embodiments may be utilized in many different types of data processing environments and operate with many different types of computing devices. The improved computing tool of the illustrative embodiments requires at least one specifically configured computing device that is specifically configured to operate as the redirect cloaking system (RCS) 220, such as a specifically configured cloaking server, and thus, this computing device is a special purpose computing device whether this configuration is performed by way of specialized hardware devices, configuration through execution of software instructions and storage of specific data structures, or any combination of specialized hardware devices and software instruction configuration.

Figure 5:
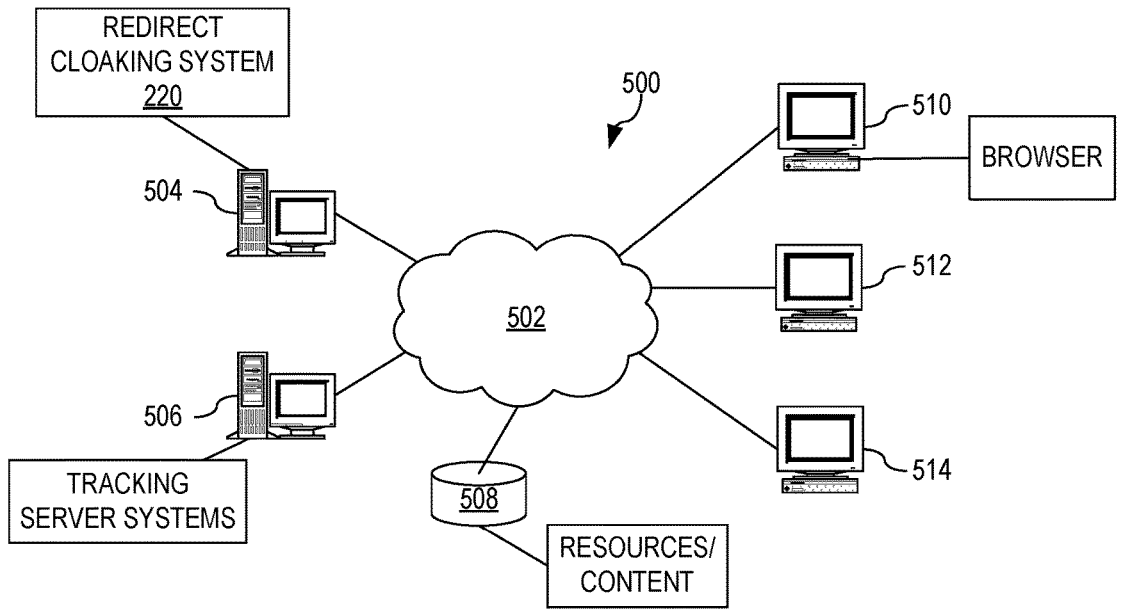
FIG. 5 is an example diagram of a distributed data processing system in which aspects of the illustrative embodiments may be implemented.
Figure 6:
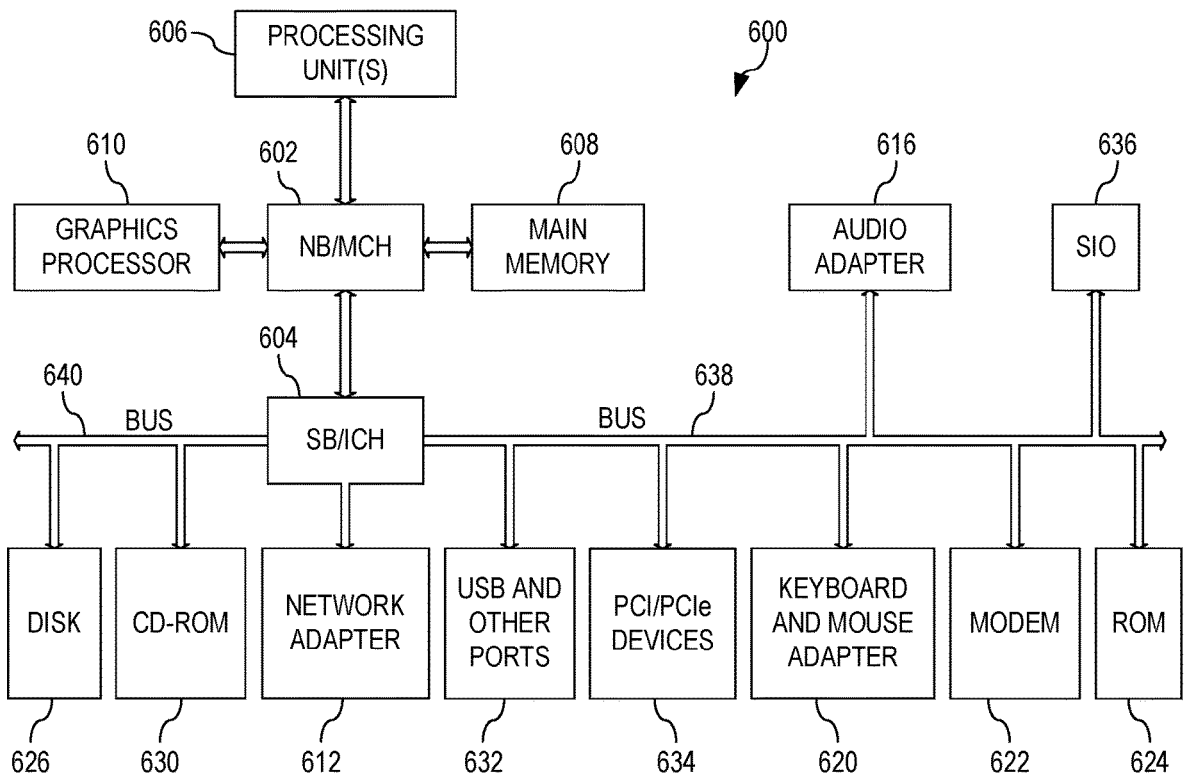
FIG. 6 is an example block diagram of a computing device in which aspects of the illustrative embodiments may be implemented.

In order to provide a context for the description of the specific elements and functionality of the illustrative embodiments, FIGS. 5 and 6 are provided hereafter as example environments in which aspects of the illustrative embodiments may be implemented. It should be appreciated that FIGS. 5 and 6 are only examples and are not intended to assert or imply any limitation with regard to the environments in which aspects or embodiments of the present invention may be implemented. Many modifications to the depicted environments may be made without departing from the spirit and scope of the present invention.

FIG. 5 depicts a pictorial representation of an example distributed data processing system in which aspects of the illustrative embodiments may be implemented. Distributed data processing system 500 may include a network of computers in which aspects of the illustrative embodiments may be implemented. The distributed data processing system 500 contains at least one network 502, which is the medium used to provide communication links between various devices and computers connected together within distributed data processing system 500. The network 502 may include connections, such as wire, wireless communication links, or fiber optic cables.

In the depicted example, server 504 and server 506 are connected to network 502 along with storage unit 508. In addition, clients 510, 512, and 514 are also connected to network 502. These clients 510, 512, and 514 may be, for example, personal computers, network computers, or the like. In the depicted example, server 504 provides data, such as boot files, operating system images, and applications to the clients 510, 512, and 514. Clients 510, 512, and 514 are clients to server 504 in the depicted example. Distributed data processing system 500 may include additional servers, clients, and other devices not shown.

In the depicted example, distributed data processing system 500 is the Internet with network 502 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 500 may also be implemented to include a number of different types of networks, such as for example, an intranet, a local area network (LAN), a wide area network (WAN), or the like. As stated above, FIG. 5 is intended as an example, not as an architectural limitation for different embodiments of the present invention, and therefore, the particular elements shown in FIG. 5 should not be considered limiting with regard to the environments in which the illustrative embodiments of the present invention may be implemented.

As shown in FIG. 5, one or more of the computing devices, e.g., server 504, may be specifically configured to implement a redirect cloaking system (RCS) 220 and operate as a cloaking server 210 for client computing devices, e.g., clients 510-514, when accessing content/resources available from various other computing systems, such as server 506, network attached storage unit 508, or the like. In so doing, the redirect cloaking system (RCS) 220 may operate to obfuscate or cloak at least a portion of any redirect chains associated with servicing requests from the clients 510-514, such as in accordance with one or more of the illustrative embodiments previously described above.

The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 504, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates obfuscation or cloaking of at least a portion of redirect chains when servicing requests from clients to access content/resources.

As noted above, the mechanisms of the illustrative embodiments utilize specifically configured computing devices, or data processing systems, to perform the operations for obfuscating or cloaking at least a portion of a redirect chain when servicing content/resource access requests from client computing devices. These computing devices, or data processing systems, may comprise various hardware elements which are specifically configured, either through hardware configuration, software configuration, or a combination of hardware and software configuration, to implement one or more of the systems/subsystems described herein. FIG. 6 is a block diagram of just one example data processing system in which aspects of the illustrative embodiments may be implemented. Data processing system 600 is an example of a computer, such as server 504 in FIG. 5, in which computer usable code or instructions implementing the processes and aspects of the illustrative embodiments of the present invention may be located and/or executed so as to achieve the operation, output, and external effects of the illustrative embodiments as described herein.

In the depicted example, data processing system 600 employs a hub architecture including north bridge and memory controller hub (NB/MCH) 602 and south bridge and input/output (I/O) controller hub (SB/ICH) 604. Processing unit 606, main memory 608, and graphics processor 610 are connected to NB/MCH 602. Graphics processor 610 may be connected to NB/MCH 602 through an accelerated graphics port (AGP).

In the depicted example, local area network (LAN) adapter 612 connects to SB/ICH 604. Audio adapter 616, keyboard and mouse adapter 620, modem 622, read only memory (ROM) 624, hard disk drive (HDD) 626, CD-ROM drive 630, universal serial bus (USB) ports and other communication ports 632, and PCI/PCIe devices 634 connect to SB/ICH 604 through bus 638 and bus 640. PCI/PCIe devices may include, for example, Ethernet adapters, add-in cards, and PC cards for notebook computers. PCI uses a card bus controller, while PCIe does not. ROM 624 may be, for example, a flash basic input/output system (BIOS).

HDD 626 and CD-ROM drive 630 connect to SB/ICH 604 through bus 640. HDD 626 and CD-ROM drive 630 may use, for example, an integrated drive electronics (IDE) or serial advanced technology attachment (SATA) interface. Super I/O (SIO) device 636 may be connected to SB/ICH 604.

An operating system runs on processing unit 606. The operating system coordinates and provides control of various components within the data processing system 600 in FIG. 6. As a client, the operating system may be a commercially available operating system such as Microsoft® Windows 10®. An object-oriented programming system, such as the Java' programming system, may run in conjunction with the operating system and provides calls to the operating system from Java™ programs or applications executing on data processing system 600.

As a server, data processing system 600 may be, for example, an IBM eServer™ System p° computer system, Power™ processor based computer system, or the like, running the Advanced Interactive Executive (AIX®) operating system or the LINUX® operating system. Data processing system 600 may be a symmetric multiprocessor (SMP) system including a plurality of processors in processing unit 606. Alternatively, a single processor system may be employed.

Instructions for the operating system, the object-oriented programming system, and applications or programs are located on storage devices, such as HDD 626, and may be loaded into main memory 608 for execution by processing unit 606. The processes for illustrative embodiments of the present invention may be performed by processing unit 606 using computer usable program code, which may be located in a memory such as, for example, main memory 608, ROM 624, or in one or more peripheral devices 626 and 630, for example.

A bus system, such as bus 638 or bus 640 as shown in FIG. 6, may be comprised of one or more buses. Of course, the bus system may be implemented using any type of communication fabric or architecture that provides for a transfer of data between different components or devices attached to the fabric or architecture. A communication unit, such as modem 622 or network adapter 612 of FIG. 6, may include one or more devices used to transmit and receive data. A memory may be, for example, main memory 608, ROM 624, or a cache such as found in NB/MCH 602 in FIG. 6.

As mentioned above, in some illustrative embodiments the mechanisms of the illustrative embodiments may be implemented as application specific hardware, firmware, or the like, application software stored in a storage device, such as HDD 626 and loaded into memory, such as main memory 608, for executed by one or more hardware processors, such as processing unit 606, or the like. As such, the computing device shown in FIG. 6 becomes specifically configured to implement the mechanisms of the illustrative embodiments and specifically configured to perform the operations and generate the outputs described herein with regard to the redirect cloaking system (RCS) 220.

Those of ordinary skill in the art will appreciate that the hardware in FIGS. 5 and 6 may vary depending on the implementation. Other internal hardware or peripheral devices, such as flash memory, equivalent non-volatile memory, or optical disk drives and the like, may be used in addition to or in place of the hardware depicted in FIGS. 5 and 6. Also, the processes of the illustrative embodiments may be applied to a multiprocessor data processing system, other than the SMP system mentioned previously, without departing from the spirit and scope of the present invention.

Moreover, the data processing system 600 may take the form of any of a number of different data processing systems including client computing devices, server computing devices, a tablet computer, laptop computer, telephone or other communication device, a personal digital assistant (PDA), or the like. In some illustrative examples, data processing system 600 may be a portable computing device that is configured with flash memory to provide non-volatile memory for storing operating system files and/or user-generated data, for example. Essentially, data processing system 600 may be any known or later developed data processing system without architectural limitation.

Thus, the illustrative embodiments provide mechanisms for obfuscating or cloaking at least a portion of the redirect chain when servicing content/resource access requests from client computing devices. The redirect cloaking system of the illustrative embodiments, as described above, is provided on a separate computing device from the client computing devices and thus, does not require any modification of the client computing devices. Moreover, the redirect cloaking system comprises logic and resources that provide an improved computer functionality that prevents or at least minimizes any leakage of sensitive data/information about the structure and relationships between entities in the redirect chains. By obfuscating or cloaking the redirect chains, and thus, preventing or minimizing the leakage of sensitive data/information, unauthorized parties that may seek to obtain an unfair competitive advantage by analyzing the redirect chain and the information contained in the redirect responses so that they can discern the technological and economic arrangements of the redirect structure, are thwarted and the privacy of the redirect chain structure and the entities involved is protected.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to cause the at least one processor to be specifically configured to implement a redirect cloaking system, the method comprising:
   receiving, by the redirect cloaking system from a client computing device, an original request to access a resource from another computing device;
   cloaking, by the redirect cloaking system, at least a portion of a redirect chain associated with servicing the original request such that at least a first portion of redirect responses of the redirect chain are not returned to the client computing device at least by:
      sending a request to a next computing system along the redirect chain targeted by the request;
      receiving a response from the next computing system;
      parsing and processing the response to determine whether the response is a redirect response;
      in response to the response from the next computing system being determined to be a redirect response, adding a generated request to a redirect stack, wherein the generated request targets a location specified in the redirect response; and
      in response to determining that the response is not a redirect response, returning an output to the client computing device wherein the output comprises a redirect to a location specified in an entry at the top of the redirect stack; and
   returning, by the redirect cloaking system, at least one of a second portion of redirect responses of the redirect chain or the resource to the client computing device without exposing the first portion of redirect responses to the client computing device.

2. The method of claim 1, wherein the data processing system is a cloaking server that operates as an intermediary between the client computing device and server computing devices, and wherein the data processing system is specifically configured to provide the redirect cloaking system to cloak redirect responses from a portion of the server computing devices such that they are not provided to the client computing device.

3. The method of claim 1, further comprising:
   determining a cloaking depth value that specifies a number of hops along the redirect chain to include in the first portion of redirect responses;
   determining, for each hop along the at least a portion of the redirect chain, a current total number of hops that have been traversed along the portion of the redirect chain; and
   in response to the current total number of hops being equal to or greater than the cloaking depth value, returning an output to the client computing device wherein the output comprises a redirect to a location specified in an entry at the top of the redirect stack.

4. The method of claim 3, wherein the cloaking depth value is determined by at least one of identifying the cloaking depth value specified in control data of the original request or calculating the cloaking depth value based on redirect chain historical data stored in a data structure of the redirect cloaking system.

5. The method of claim 1, wherein determining whether the response is a redirect response comprises at least one of determining whether the response comprises a status code corresponding to a redirect status code or determining whether header information of the response indicates the response to be a refresh redirect.

6. The method of claim 1, wherein determining whether the response is a redirect response comprises performing a pattern matching operation with regard to stored patterns of regular expressions corresponding to redirect responses.

7. The method of claim 1, wherein the original request is an incoming HyperText Markup Language (HTML) having one or more uniform resource locators (URLs), and wherein cloaking at least a portion of a redirect chain associated with servicing the request comprises for each URL specified in the incoming HTML:
   sending a request to a target computing system targeted by the URL;
   receiving a response from the target computing system;
   parsing and processing the response to determine whether the response is a redirect response; and
   in response to the response from the target computing system being determined to be a redirect response, modifying the URL to be a URL in an entry at the top of the redirect stack.

8. The method of claim 1, wherein returning, by the redirect cloaking system, at least one of a second portion of redirect responses of the redirect chain or the resource to the client computing device without exposing the first portion of redirect responses to the client computing device comprises traversing the redirect chain until a response is received that is not a redirect response and returning to the client computing device an immediately previous redirect response to the client computing device in response to a response being received that is not a redirect response.

9. A computer program product comprising a computer readable storage medium having a computer readable program stored therein, wherein the computer readable program, when executed on a data processing system, causes the data processing system to be specifically configured to implement a redirect cloaking system that operates to:
   receive, from a client computing device, an original request to access a resource from another computing device;
   cloak at least a portion of a redirect chain associated with servicing the original request such that at least a first portion of redirect responses of the redirect chain are not returned to the client computing device at least by:
      sending a request to a next computing system along the redirect chain targeted by the request;
      receiving a response from the next computing system;
      parsing and processing the response to determine whether the response is a redirect response;
      in response to the response from the next computing system being determined to be a redirect response, adding a generated request to a redirect stack, wherein the generated request targets a location specified in the redirect response; and
      in response to determining that the response is not a redirect response, returning an output to the client computing device wherein the output comprises a redirect to a location specified in an entry at the top of the redirect stack; and
   return at least one of a second portion of redirect responses of the redirect chain or the resource to the client computing device without exposing the first portion of redirect responses to the client computing device.

10. The computer program product of claim 9, wherein the data processing system is a cloaking server that operates as an intermediary between the client computing device and server computing devices, and wherein the data processing system is specifically configured to provide the redirect cloaking system to cloak redirect responses from a portion of the server computing devices such that they are not provided to the client computing device.

11. The computer program product of claim 9, wherein the computer readable program further causes the redirect cloaking system to:
   determine a cloaking depth value that specifies a number of hops along the redirect chain to include in the first portion of redirect responses;
   determine, for each hop along the at least a portion of the redirect chain, a current total number of hops that have been traversed along the portion of the redirect chain; and
   in response to the current total number of hops being equal to or greater than the cloaking depth value, return an output to the client computing device wherein the output comprises a redirect to a location specified in an entry at the top of the redirect stack.

12. The computer program product of claim 11, wherein the cloaking depth value is determined by at least one of identifying the cloaking depth value specified in control data of the original request or calculating the cloaking depth value based on redirect chain historical data stored in a data structure of the redirect cloaking system.

13. The computer program product of claim 9, wherein determining whether the response is a redirect response comprises at least one of determining whether the response comprises a status code corresponding to a redirect status code or determining whether header information of the response indicates the response to be a refresh redirect.

14. The computer program product of claim 9, wherein determining whether the response is a redirect response comprises performing a pattern matching operation with regard to stored patterns of regular expressions corresponding to redirect responses.

15. The computer program product of claim 9, wherein the original request is an incoming HyperText Markup Language (HTML) having one or more uniform resource locators (URLs), and wherein cloaking at least a portion of a redirect chain associated with servicing the request comprises for each URL specified in the incoming HTML:
   sending a request to a target computing system targeted by the URL;
   receiving a response from the target computing system;
   parsing and processing the response to determine whether the response is a redirect response; and
   in response to the response from the target computing system being determined to be a redirect response, modifying the URL to be a URL in an entry at the top of the redirect stack.

16. An apparatus comprising:
   a processor; and
   a memory coupled to the processor, wherein the memory comprises instructions which, when executed by the processor, cause the processor to be specifically configured to implement a redirect cloaking system that operates to:

receive, from a client computing device, an original request to access a resource from another computing device;
cloak at least a portion of a redirect chain associated with servicing the original request such that at least a first portion of redirect responses of the redirect chain are not returned to the client computing device at least by:
sending a request to a next computing system along the redirect chain targeted by the request;
receiving a response from the next computing system;
parsing and processing the response to determine whether the response is a redirect response;
in response to the response from the next computing system being determined to be a redirect response, adding a generated request to a redirect stack, wherein the generated request targets a location specified in the redirect response; and
in response to determining that the response is not a redirect response, returning an output to the client computing device wherein the output comprises a redirect to a location specified in an entry at the top of the redirect stack; and
return at least one of a second portion of redirect responses of the redirect chain or the resource to the client computing device without exposing the first portion of redirect responses to the client computing device.

17. The apparatus of claim 16, wherein the data processing system is a cloaking server that operates as an intermediary between the client computing device and server computing devices, and wherein the data processing system is specifically configured to provide the redirect cloaking system to cloak redirect responses from a portion of the server computing devices such that they are not provided to the client computing device.

18. The apparatus of claim 16, wherein the instructions further cause the redirect cloaking system of the processor to:

determine a cloaking depth value that specifies a number of hops along the redirect chain to include in the first portion of redirect responses;
determine, for each hop along the at least a portion of the redirect chain, a current total number of hops that have been traversed along the portion of the redirect chain; and
in response to the current total number of hops being equal to or greater than the cloaking depth value, return an output to the client computing device wherein the output comprises a redirect to a location specified in an entry at the top of the redirect stack.

19. The apparatus of claim 16, wherein determining whether the response is a redirect response comprises at least one of determining whether the response comprises a status code corresponding to a redirect status code, determining whether header information of the response indicates the response to be a refresh redirect, or performing a pattern matching operation with regard to stored patterns of regular expressions corresponding to redirect responses.

20. The apparatus of claim 16, wherein the original request is an incoming HyperText Markup Language (HTML) having one or more uniform resource locators (URLs), and wherein cloaking at least a portion of a redirect chain associated with servicing the request comprises for each URL specified in the incoming HTML:
sending a request to a target computing system targeted by the URL;
receiving a response from the target computing system;
parsing and processing the response to determine whether the response is a redirect response; and
in response to the response from the target computing system being determined to be a redirect response, modifying the URL to be a URL in an entry at the top of the redirect stack.

* * * * *